(12) United States Patent
Matsuda

(10) Patent No.: US 7,654,534 B2
(45) Date of Patent: Feb. 2, 2010

(54) PRIZE-WINNING GAME MACHINE AND APPARATUS FOR GRASPING AN OBJECT

(75) Inventor: Takashi Matsuda, Tokyo (JP)

(73) Assignee: Sega Corporation, Tokyo (JP)

(*) Notice: Subject to any disclaimer, the term of this patent is extended or adjusted under 35 U.S.C. 154(b) by 113 days.

(21) Appl. No.: 12/059,079

(22) Filed: Mar. 31, 2008

(65) Prior Publication Data

US 2008/0242413 A1    Oct. 2, 2008

(30) Foreign Application Priority Data

Mar. 30, 2007  (JP)  ............................. 2007-093453

(51) Int. Cl.
*A63F 9/30*   (2006.01)
(52) U.S. Cl. .................................... 273/448
(58) Field of Classification Search ............... 273/440, 273/447, 448, 459, 460; 221/210; 254/264, 254/278, 266; 212/80, 84
See application file for complete search history.

(56) References Cited

U.S. PATENT DOCUMENTS

| 7,080,840 | B1* | 7/2006 | Chen | ........................... 273/447 |
|---|---|---|---|---|
| 2003/0011133 | A1* | 1/2003 | Uedono et al. | ............... 273/447 |
| 2003/0116919 | A1* | 6/2003 | Jeon | ........................... 273/448 |
| 2003/0151202 | A1* | 8/2003 | Fisher et al. | ................. 273/447 |
| 2006/0170164 | A1* | 8/2006 | Watanabe | .................... 273/447 |
| 2006/0249909 | A1* | 11/2006 | Yumiya | ....................... 273/447 |
| 2006/0255544 | A1* | 11/2006 | Halliburton | .................. 273/447 |
| 2007/0013139 | A1* | 1/2007 | Kumagai | ..................... 273/448 |
| 2008/0242413 | A1* | 10/2008 | Matsuda | ....................... 463/38 |

FOREIGN PATENT DOCUMENTS

| JP | 2003-062323 A | | 3/2003 |
|---|---|---|---|
| JP | 2008228965 A | * | 10/2008 |
| JP | 2008246074 A | * | 10/2008 |

* cited by examiner

*Primary Examiner*—Raleigh W. Chiu
(74) *Attorney, Agent, or Firm*—Arent Fox LLP

(57) ABSTRACT

The prize arrangement is limited in many conventional prize-winning game machines, in which the usable area is only the floor. In a crane game machine of the present invention for grasping a prize, an object grasping system (grasping arms) grasping a prize is suspended by a first and a second wire which are respectively controlled in length by a first and a second Z mechanisms. Thus, the object grasping system can be moved in the longitudinal and the vertical direction, and a direction of the grasping arms can be rotated up-and-down by a predetermined angle. As a result, the grasping arms are capable of grasping the prize disposed on a self provided on the back wall face side of the game machine.

8 Claims, 17 Drawing Sheets

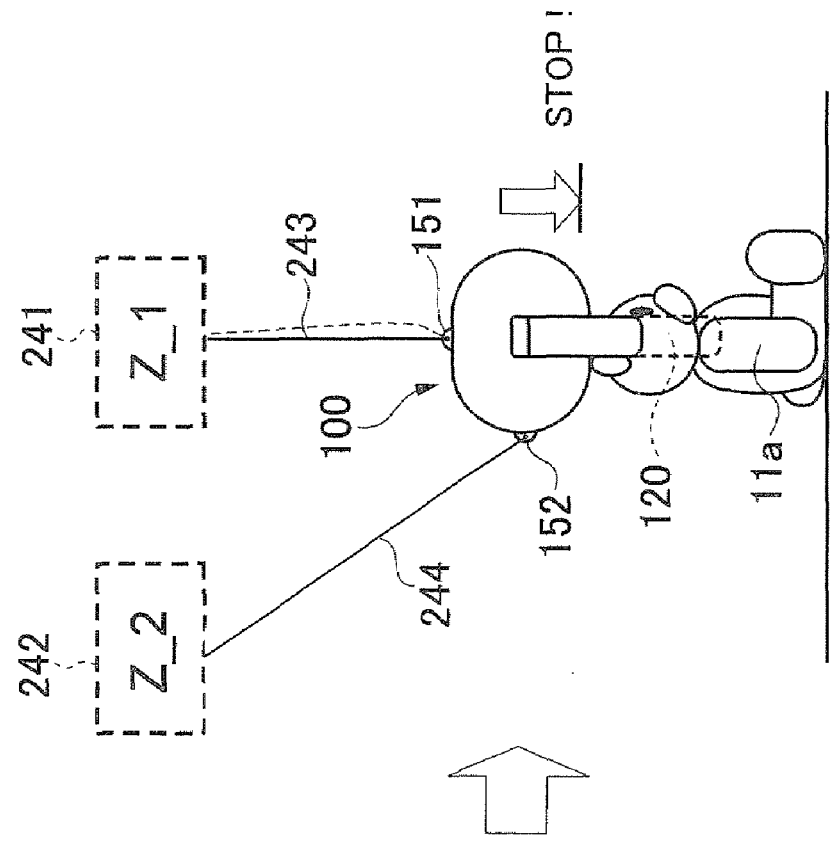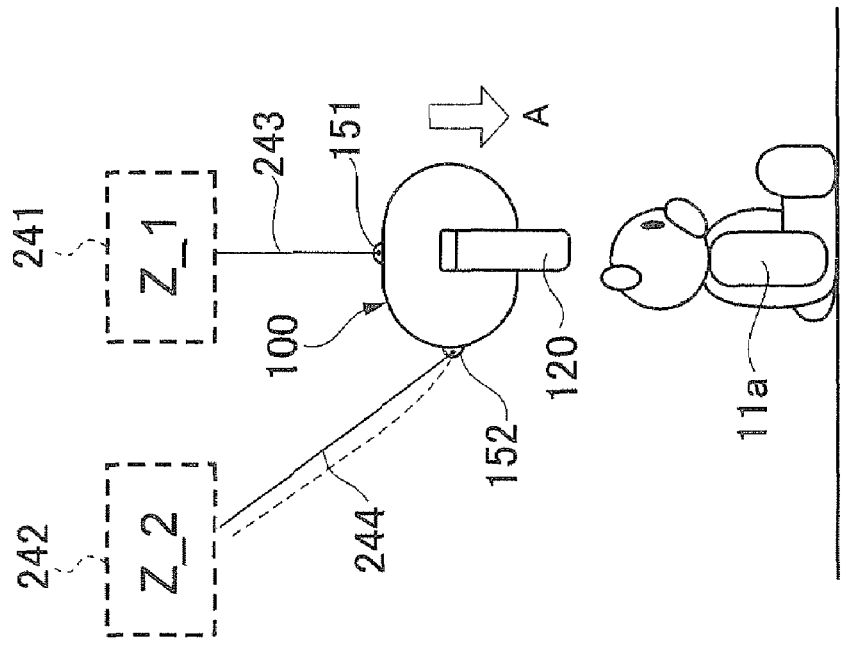

PRIZE-WINNING GAME MACHINE AND APPARATUS FOR GRASPING AN OBJECT

BACKGROUND OF THE INVENTION

1. Field of the Invention

This invention relates to a prize-winning game machine, in which a player maneuvers a grasping arm to win a prize, i.e., an object, and to an object grasping apparatus.

2. Description of Related Art

A prize-winning game machine such as so-called "UFO CATCHER" (registered trademark) (hereinafter referred to simply as "game machine") is known as a type of amusement machine in which a player attempts to capture a prize contained within the prize container.

The player operates two or three control buttons provided on such a game machine to maneuver a crane. For example, in a type of game machine having two control buttons, the player operates the first button to move the crane located above the prizes in either a right or left direction (only one direction). While the first button is being depressed, the crane keeps moving until it reaches the limit point. Once the first button is released, the crane stops moving and will never move even when the first button is pressed again.

Then, upon depression of the second button, the crane moves toward the rear of the game machine. In this case, the crane keeps moving until the second button is released or the crane reaches the limit point. After the crane has been stopped in the desired position, the game machine automatically operates in order the steps of: spreading out a pair of grasping arms; moving the crane down; closing the grasping arms (e.g. the operation of a prize); lifting the crane up; moving the crane to a point above an outlet; opening up the grasping arms (e.g. the operation of dropping the grasped prize); and then closing the grasping arms.

Such a game machine provides the simple pleasure of grasping a prize and lifting it up. Accordingly, the player may possibly get bored with the monotony of playing a game in which the player simply moves the grasping arms in the right-and-left direction and the fore-and-aft direction (when viewed from the front of the game machine, hereinafter respectively referred to as "the X direction" and "the Y direction") to a desired position, then moves the opening grasping arms straight down to grasp the prize with the grasping arms, and then closes the grasping arms when they engage with the prize. That is, the direction in which the player can attempt to grasp the prize is limited to one direction, from the upward direction. For this reason, the player cannot grasp any prize other than a prize located at the top of prizes piled up on the playing field. As a result, the game lacks interest and is apt to make the player feel bored.

In addition, there is a problem of non-effective use of the space in the prize container. This is because, since a prize is grasped only from the upward direction, the way of showing the prizes is limited.

There are various approaches to overcome such problems. For example, Japanese Patent Unexamined Publication No. 2003-062323 discloses a crane game machine comprising a prize catcher attached to the leading end of a telescopic boom. The base of the telescopic boom is rotatably mounted on a horizontal shaft retained in a desired position in the playing field cabinet such that the telescopic boom can swing about the horizontal shaft. In addition, a prize-catcher controller is proved for controlling at least the swinging angle of the telescopic boom pivoting about the horizontal shaft, the telescoping operation of the telescopic boom and the opening operation of the grasping arms of the prize catcher, on the basis of the player's operation.

The crane game machine disclosed in Japanese Patent Unexamined Publication No. 2003-062323 offers enhanced enjoyment of the game and also an increased flexibility in arranging the prizes by a greatly increased number of directions in which the prize catcher can grasp a prize as compared with the previous number in the related art. This is because the base of the telescopic boom to which the prize catcher having the grasping arms is attached is rotatably mounted on the horizontal shaft secured in a desired position in the playing field cabinet so that the telescopic boom can swing about the horizontal shaft.

It is true that such a crane game machine does increase the number of directions in which the prize catcher can grasp a prize by means of such a rotatable connection of the base of the telescopic boom to which the prize catcher having the grasping arms is attached. However, these directions in which the prize catcher can grasp a prize are limited to the directions of the swinging movement of the telescopic boom about the horizontal shaft.

In addition, if the direction from which the prize catcher grasps a prize is limited by the swinging movement of the telescopic boom about the horizontal shaft, it is obliged to arrange the prizes in the playing field cabinet according to the directions of grasping the prize by the prize catcher. In consequence, the degree of flexibility of the arrangement of the prizes is also limited.

SUMMARY OF THE INVENTION

The present invention has been made in light of the foregoing circumstances. Accordingly, it is an object of the present invention to provide a prize-winning game machine and an object grasping apparatus which are capable of drastically decreasing the limitations on the directions in which the object grasping apparatus having a set of grasping arms can grasp a prize and of considerably removing the limitations on the arrangement of the prizes.

In an aspect, the present invention provides a prize-winning game machine which comprises: operation means operated by a player; a playing field containing prizes; a grasping member having arms either hooking or grasping one of the prizes; a movement mechanism for moving the grasping member in a predetermined direction on the basis of operation from the operation means; at least two wires or more for suspending the grasping member; two wire fastening members or more which are provided on the grasping member and to which the wires are respectively fastened; and at least two drive mechanisms or more corresponding to the wires as provided in the movement mechanism for adjusting respective winding/unwinding amounts of the wires. In the prize-winning game machine, the wires are respectively extended out from a predetermined position of the respective drive mechanisms located away from each other to the wire fastening members on the grasping member, so that the grasping member is suspended by the wires. The drive mechanisms are independently adjusted to turn a portion of the grasping member coming into contact with the prize at least in an up-and-down direction.

At least one of the drive mechanisms may be adjustable in position.

Each of the drive mechanisms may be a motor provided in the predetermined position, and may have a wire control member for controlling the winding/unwinding amount of the wire by use of the motor to rewind or unwind the wire.

At least one of the wire fastening members may be attached to allow the arms to be turned when one of the drive mechanisms corresponding to the at least one wire fastening member winds/unwinds the wire.

The wire control member may control the winding/unwinding amount of the wire such that tension is produced on the wire.

The wire control member comprises a tension detector for detecting presence/absence of tension produced on the wire.

The prize-winning game machine may further comprise a plurality of prize shelves for arranging the prizes.

In another aspect, the present invention provides an object grasping apparatus which comprises: a grasping member having arms either hooking or grasping an object; at least two wires or more for suspending the grasping member; two wire fastening members or more which are provided on the grasping member and to which the wires are respectively fastened; and at least two drive mechanisms or more corresponding to the wires as provided for adjusting the respective winding/unwinding amounts of the wires. In the object grasping apparatus, the wires are respectively extended out from a predetermined position of the respective drive mechanisms located away from each other to the wire fastening members on the grasping member, so that the grasping member is suspended by the wires. The drive mechanisms are independently adjusted to turn a portion of the grasping member coming into contact with the object at least in an up-and-down direction.

In the prize-winning game machine and the object grasping apparatus according to the present invention, a plurality of wires respectively extend out from predetermined fixed positions, and are fastened to different positions of the grasping mechanism grasping an object. The length of each of the wires extending out from the fixed positions is variably controlled under a predetermined tension. As a result, along with the movement of the spatial position of the grasping mechanism, the orientation of the grasping mechanism facing the object can be changed.

The present invention employs a plurality of wires to move the grasping arms. In addition, the orientation of the grasping arms can be changed rotatably in the up-and-down direction by appropriately adjusting the mounting positions of the wires. In consequence, the prize-winning game machine and the object grasping apparatus of the present invention are capable of significantly easing the limitation on the directions in which the object grasping apparatus having the grasping arms grasps a prize and of considerably easing the limitation on the arrangement of the prizes.

BRIEF DESCRIPTION OF THE DRAWINGS

These and other objects and advantages of the present invention will become clear from the following description with reference to the accompanying drawings, wherein:

FIG. 7(a) and FIG. 7(b) are the respective partial enlarged diagrams of FIG. 6 for illustrating the consecutive processes of grasping the first prize disposed directly below the reference position in the Y direction;

DETAILED DESCRIPTION OF THE PREFERRED EMBODIMENTS

An embodiment of the present invention relates to a crane game machine grasping a prize, in which a grasping apparatus (grasping arms) for grasping a prize is suspended by, for example, two wires. The movement of the grasping apparatus in the fore-and-aft direction (the Y direction) and the up-and-down direction (the Z direction) is achieved by motorized control of the length of each of the wires. In addition, in a conventional grasping apparatus the grasping arms open only downward. However, the open orientation of the grasping arms of the present embodiment can be changed in the up-and-down directions within a range determined by the mounting positions of, for example, two wires which are desirably set with respect to the grasping apparatus. In consequence, it is possible to display prizes on the back wall face of the prize container of the game machine and to grasp them from the lateral direction.

Figure 1:
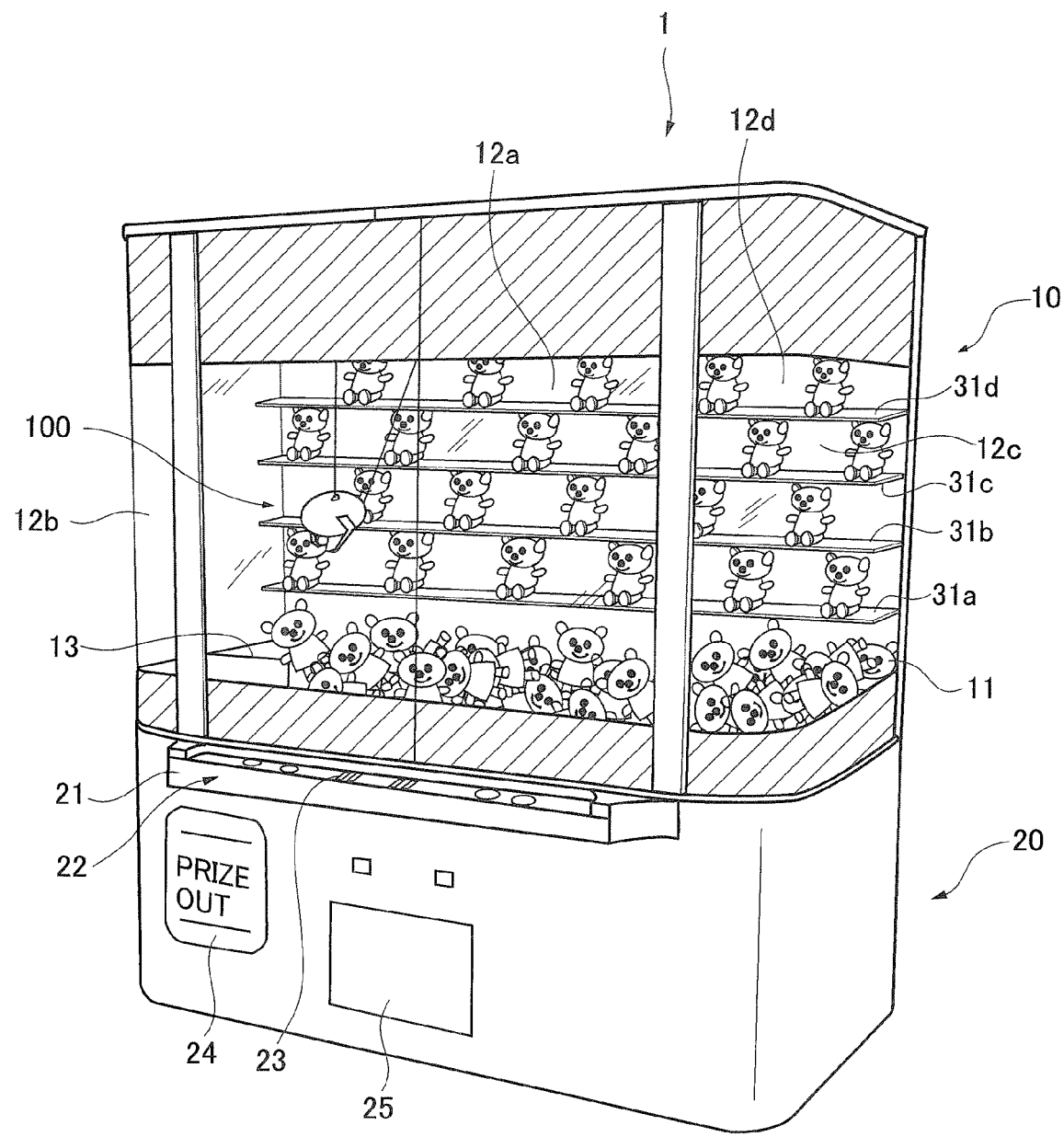
FIG. 1 is a perspective view illustrating an embodiment of a prize-winning game machine according to the present invention.
Figure 2:
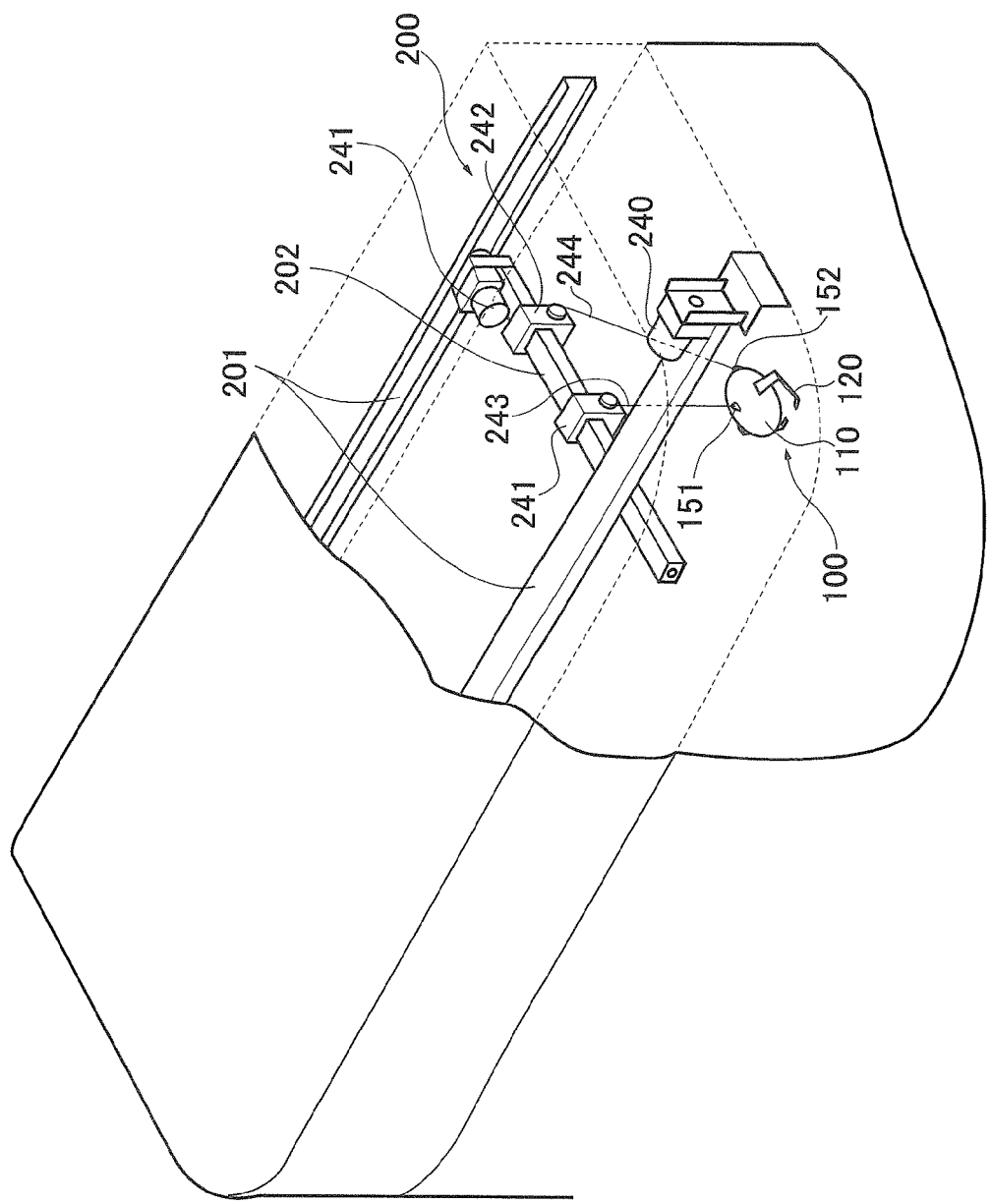
FIG. 2 is a perspective view illustrating the prize-winning game machine as shown in FIG. 1 when viewed from the above.

An exemplary embodiment according to the present invention will be described below in detail. FIG. 1 is a perspective view illustrating an embodiment of a prize-winning game machine according to the present invention. FIG. 2 is a perspective view of the prize-winning game machine in FIG. 1 when viewed from the above.

A crane game machine 1 (hereinafter referred to simply as "game machine 1") illustrated in FIGS. 1 and 2, which is the prize-winning game machine, comprises a box-shaped prize container 10 and a support base 20 on which the prize container 10 is mounted.

The prize container 10 is provided for containing prizes 11 such as stuffed toys. The prize container 10 has at least a front face 12a and side faces 12b and 12c formed of plate members made of transparent resin or glass which allow the player to check, for example, the positions of the contained prizes 11 from the front and the right and left.

The prize container 10 has a back face 12d on which plate-shaped first to fourth shelves 31a to 31d numbered from the bottom are provided. The prizes 11 such as stuffed toys are arranged on each of the prize shelves 31a to 31d as well as on the bottom face of the container 10. The prize shelves 31a to 31d may be spaced either regularly or irregularly.

An approximately cylindrical prize outlet 13 is provided at the bottom of the prize container 10 for receiving, for example, the grasped prize 11. The prize outlet 13 extends from the bottom approximately in the up-and-down direction in FIG. 1 (hereinafter referred to as "the Z direction"), and is linked to a prize dispensing port 24 which will be described. The prize outlet 13 is not necessary required. The bottom of the prize container 10 may be directly connected to the prize dispensing port 24.

As shown in FIG. 2, a moving mechanism assembly 200 is provided on the inner top face of the prize container 10. The moving mechanism assembly 200 moves an object grasping system 100 in the right-and-left direction (i.e. the X direction), the fore-and-aft direction (i.e. the Y direction) and the up-and-down direction (i.e. the Z direction). The object grasping system 100 is suspended by first and second wires 243 and 244.

The moving mechanism assembly 200 has two traverse stationary rails 201 extending in the X direction for moving the object grasping system 100 in the X direction. The traverse stationary rails 201 are arranged in parallel at a predetermined interval. The traverse stationary rails 201 carry a motor-supporting longitudinal rail 202 which is movable in the X direction.

First and second Z mechanisms 241 and 242 are respectively mounted on portions of the motor-support longitudinal rail 202 close to the opposing ends thereof. The first Z mechanism 241 comprises a motor and a first wire 243. The first Z mechanism 241 winds up and unwinds the first wire 243 for control of the length.

Likewise, the second Z mechanism 242 comprises a motor and a second wire 244. The second Z mechanism 242 winds up and unwinds the second wire 244 for control of the length. The first and second Z mechanisms 241 and 242 respectively comprise a first and second rotational speed sensors 130 and 131 for detecting the amounts of unwinding of the first and second wires 243 and 244.

The first and second wires 243 and 244 have one end secured respectively to the first and second Z mechanisms 241 and 242 and the other end secured to the object grasping system 100. Thus, the object grasping system 100 can be moved in the Y direction and the Z direction by driving the first and second Z mechanisms 241 and 242 to control the lengths of the first and second wires.

In addition, the mounting positions of the first and second wires 243 and 244 determined with respect to the object grasping system 100 are spaced from each other at a desired distance. As a result, the orientation of the object grasping system 100 can rotate in the up-and-down direction within a predetermined range. The movement of the object grasping system 100 in the Y direction and the Z direction and the turning movement in the up-and-down direction will be described later. The first and/or second wires 243 and 244 may serve as power supply lines for the object grasping system 100 or as signal lines for controlling the object grasping system 100. In this case, the need to provide a separate power supply line and/or control signal line is eliminated.

The first and second Z mechanisms 241 and 242 respectively have first and second tension sensors 261 and 262 for detection of the presence/absence of tension, that is, wire slack, acting on the first and second wires 243 and 244. The detection of the presence/absence of tension by each of the first and second tension sensors 261 and 262 makes it possible to maintain the tension on each of the first and second wires 243 and 244 until the object grasping system reaches the prize 11 or the bottom surface of the prize container 10.

A pair of grasping arms 120 provided in the object grasping system 100 can be kept in position facing the prize 11 by use of the first and the second tension sensors 261 and 262 to maintain the tension on the first and second wires 243 and 244. The functions of the first and second tension sensors 261 and 262 will be described in detail later.

An X-direction movement motor 240 is mounted on one of the traverse stationary rails 201 for moving the motor-supporting longitudinal rail 202 with the first and second Z mechanisms 241 and 242 in the X direction.

The object grasping system 100 has a grasping mechanism assembly 110 and a pair of grasping arms 120. The case of a pair of grasping arms 120 is here described, but the number of grasping arms may be one or three or more. The pair of grasping arms 120 is closed in normal mode and is opened when grasping the prize 11, as will be described in detail later. The present embodiment describes the case of using an object grasping system that grasps an object. However, the system is not limited to the grasping type. For example, the system may be of a hook-shaped type in which the grasping arms engage with an object or of an extendable-arm-shaped type in which the grasping arms extend when hooking an object and then contract after hooking with the object.

Figure 3:
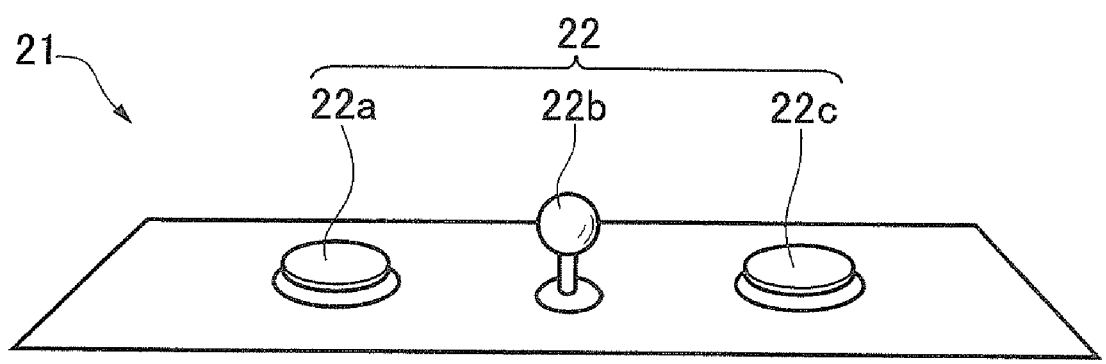
FIG. 3 is a diagram illustrating the appearance of the control panel of the prize-winning game machine as shown in FIG. 1.

On the other hand, the support base 20 shown in FIG. 1 is provided with a control panel 21 for player use. FIG. 3 shows a perspective view of the appearance of the control panel 21.

The control panel 21 is equipped with a plurality of operation members 22 for stopping the pair of grasping arms 120 of the object grasping system 100 in a position corresponding to a desired prize 11. The operation members 22 employed here includes a first button switch 22a, a lever 22b and a second button switch 22c. The first button switch 22a is used to move the pair of grasping arms 120 of the object grasping system 100 to a predetermined position in the X direction. After the operation of the first button switch 22a, the lever 22b is used to move the pair of grasping arms 120 of the object grasping system 100 to a predetermined position in the Y direction. The second button switch 22c is used to move the pair of grasping arms 120 of the object grasping system 100 in a predetermined position in the Z direction.

The control panel 21 is additionally provided with a coin slot 23 into which the player inserts a coil for playing the game, and the like. The prize dispensing port 24 connecting to the prize outlet 13 is provided under the control panel 21. An open/close door is provided under the control panel 21.

Inside the open/close door 25 control buttons, control dials, an interface (not shown) such as a liquid crystal panel, and the like are provided to enable a shop manager or the like to make various settings of the game machine 1. Based on the various settings made by the shop manager operating the control buttons and the like, a computer provided in the support base 20 controls the operation of the game machine 1.

Figure 4:
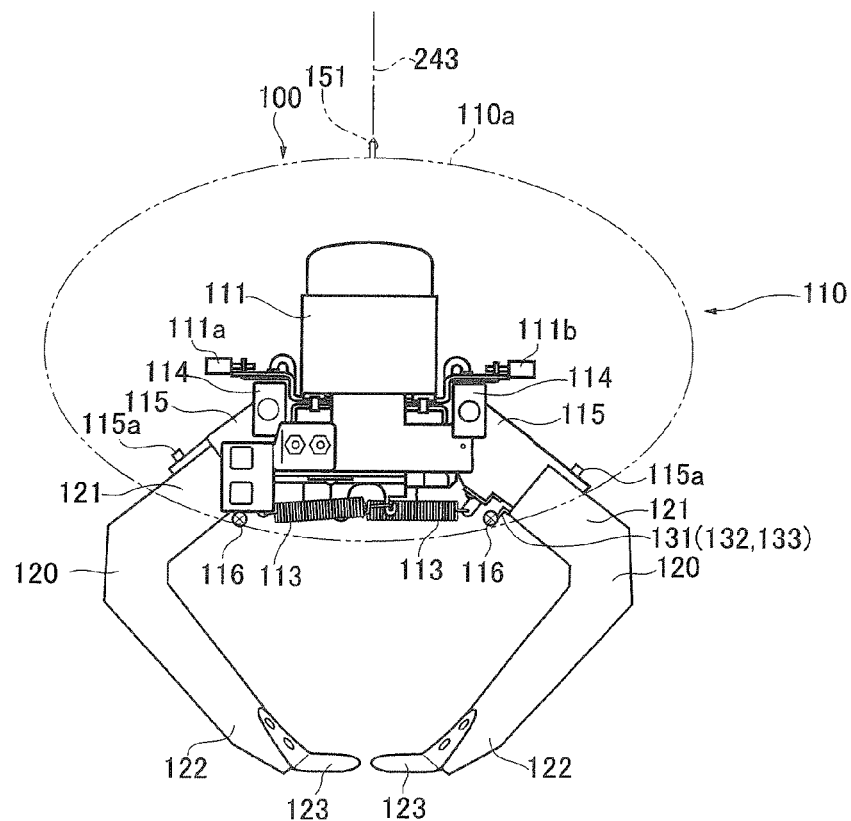
FIG. 4(a) and FIG. 4(b) illustrate an object grasping apparatus for the prize-winning game machine as shown in FIG. 1 according to the present invention.
Figure 4:
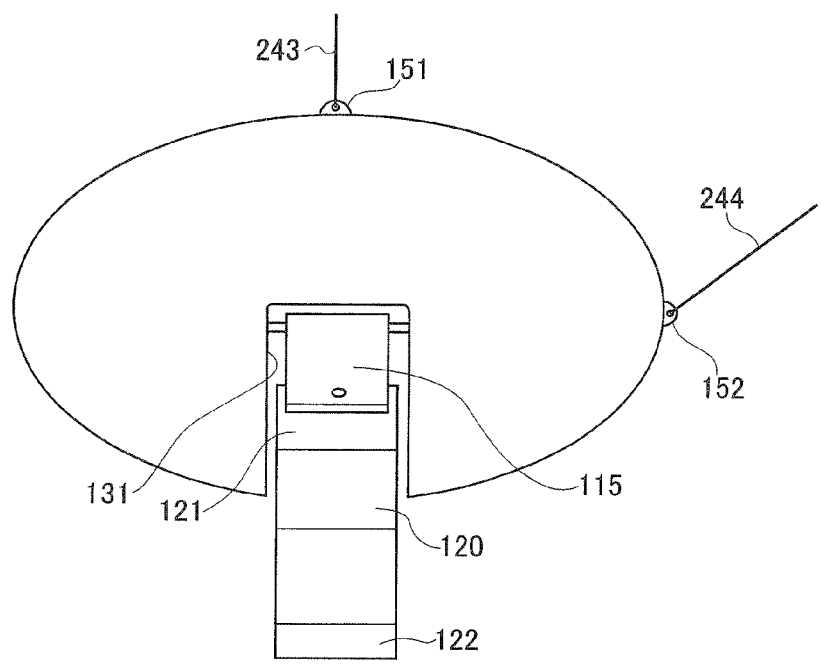

FIGS. 4A and 4B are diagrams illustrating the object grasping system 100. FIG. 4(a) is a front view illustrating the interior structure of the object grasping system 100 and FIG. 4(b) is a side view illustrating the object grasping system 100 with the first and second wires 243, 24 secured.

As shown in FIG. 4(a), the grasping mechanism assembly 110 of the object grasping system 100 comprises a grasping motor (m) 111 serving as the power source, an arm opening mechanism, coil springs 113, brackets 114, arm bases 115, and an oval-sphere-shaped cover 110a covering them. The arm opening mechanism has a rack, a pinion and the like to open/close the grasping arms 120 based on the rotational output of the grasping motor (m) 111. The coil springs 113 generate the maximum grasping force of the grasping arms 120 when they grasp the prize 11. The arm bases 115 are rotatably mounted to the respective brackets 114.

Claws 123 are respectively provided on the leading ends of the grasping arms 120 for grasping or hooking with the prize 11.

In the object grasping system 100, when the grasping motor (m) 111 is rotated in the forward or reverse direction, the motor torque is transmitted to the pinion described in detail later. Then, the rotation of the pinion moves the rack in the right or left direction. As a result, the grasping arms 120 opens/closes.

FIG. 4(b) shows a side view of the object grasping system 100. In FIG. 4(b), the cover 11a has arm moving slots 131 formed therein. Each of the arm moving slots 131 has a predetermined width and extends vertically downward from the center of the oval shape in FIG. 4(b). As a result, the cover 11a never obstructs the opening/closing movement of the grasping arms 120.

The first wire 243 is secured through a first wire fastening portion 151 to the top of the meridian of the outer rim of the cover 110a, that is, to the upper end of the short diameter of the oval shape shown in FIG. 4(b).

The second wire 244 is secured through a second wire fastening portion 152 to the equator of the outer rim of the cover 110a, that is, to the right end of the long diameter of the oval shape shown in FIG. 4(b). Specifically, the first wire fastening portion 151 is located on the opposite side of the cover 110a from the grasping arm 120 in FIG. 4(b). The second wire mounted portion 152 is located on a portion of the cover 11a shifted approximately 90 degrees with respect to the opening/closing direction of the grasping arms 120. Note that the second wire fastening portion 152 can be provided at any position as described later.

Next, a description will given of the movement of the object grasping system 100 thus structured in the Y direction and the Z direction.

Figure 5:
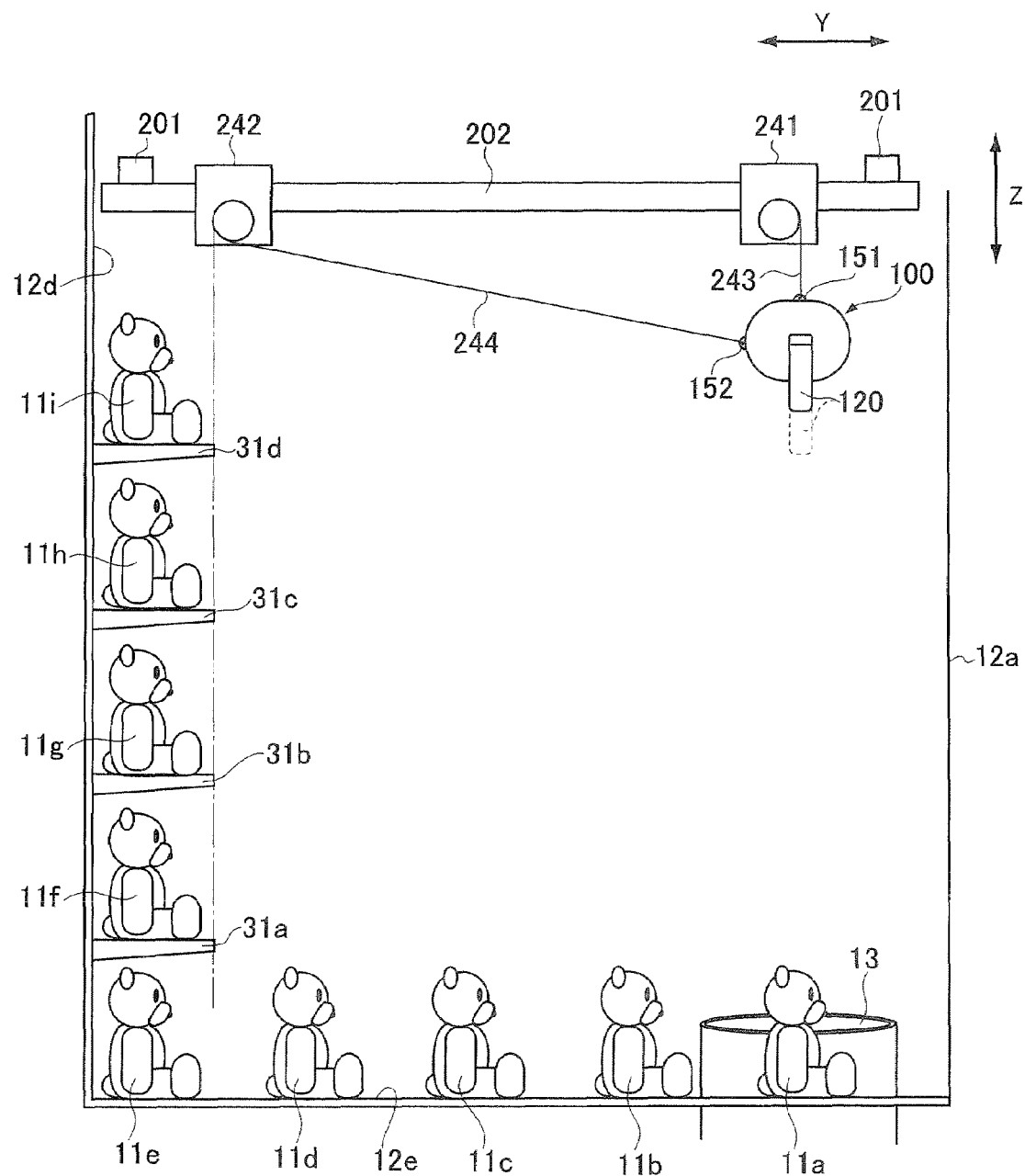
FIG. 5 is a view illustrating the inside of the prize-winning game machine as shown in FIG. 1 when viewed from a side angle.

FIG. 5 is a view of the inside of the game machine 1 when viewed from the side. The position of the object grasping system 100 in FIG. 5 is the home position of the object grasping system 100 before starting a game. Upon the start of the game, the object grasping system 100 starts moving from the position shown in FIG. 5, and returns to this position when the game is terminated. The front face 12a is the right side in FIG. 5. A first to fifth prizes 11a to 11d are arranged in this order from the front face 12a toward the back face 12d on the floor 12e.

The first to fourth shelves 31a to 31d numbered from the bottom are provided on the back face 12d. The sixth to ninth prizes 11f to 11i toys are placed on the respective prize shelves 31a to 31d.

The motor-supporting longitudinal rail 202 is mounted on the two traverse stationary rails 201 which are respectively provided close to the front face 12a and the back face 12d. The motor-supporting longitudinal rail 202 is capable of moving in the X direction, that is, in the direction of the normal to the sheet of FIG. 5.

The first Z mechanism 241 is mounted on a portion of the motor-supporting longitudinal rail 202 which is close to the end of the motor-supporting longitudinal rail 202 closer to the front face 12a and is on the left of the traverse stationary rail 201. The first wire 243 is unwindably provided in the first Z mechanism 241. The end of the first wire 243 extending out from the first X mechanism 241 is fixed to the first wire fastening portion 151 of the object grasping system 100.

Likewise, the second Z mechanism 242 is mounted on a portion of the motor-supporting longitudinal rail 202 which is close to the end of thereof closer to the back face 12d and is on the right of the traverse stationary rail 201. The second wire 244 is unwindably provided in the second Z mechanism 242. The end of the second wire 244 extending out from the second X mechanism 242 is fixed to the second wire fastening portion 152 of the object grasping system 100.

The mounting position of the second Z mechanism 242 to the motor-supporting longitudinal rail 202 is adjustable in the Y direction, i.e., in the right-left direction in FIG. 5. This mounting position can be adjusted such that the second wire 244 is out of contact with the leading ends of the first to fourth prize shelves 31a to 31d when the second wire 244 extends in a direction perpendicular to the floor 12e.

In FIG. 5, the first wire 243 extends approximately perpendicular to the floor 12e. Assume that the object grasping system is approximately spherical in shape. The position of the first wire fastening portion 151 is at approximately zero degrees, and the position of the second wire fastening portion 152 is at approximately 270 degrees. A preferable result of this is that the grasping direction of the grasping arms 120 is downward.

The second wire fastening portion 152 is, however, not necessarily required to be positioned at approximately 270 degrees. Specifically, assume that a first extension line of the first wire 241 extending out from the first Z mechanism 241 in the approximately perpendicular direction to the floor 12e and a second extension line extending out from the second Z mechanism 242 intersect each other at the center of gravity of the object grasping system 100. In this assumption, the second wire fastening portion 152 can be set to any position as long as the wire fastening portion 152 is located such that the second wire 244 is located outside the second extension line (i.e., leftward in FIG. 5) of the three sides of an approximately triangle shape made up of a portion of the motor-supporting longitudinal rail 202 between the first and second Z mechanisms 241, 242 in the longitudinal direction, the first extension line, and the second extension line.

Thus, the second wire 244, which has the end fastened to the second wire fastening portion 152, can be wound/unwound by the second Z mechanism, so that the second wire fastening portion 152 is turned in the up-and-down direction. As a result, the grasping direction of the grasping arms 120 can be changed to the up-and-down direction.

When the object grasping system 100 is in its home position, it is located right above the prize outlet 13. The prize outlet 13 is not necessarily required to be located right under the object grasping system 100. A prize outlet can be disposed on any site in the area in which the prizes 11 are arranged (i.e., the prize container 10).

Figure 6:
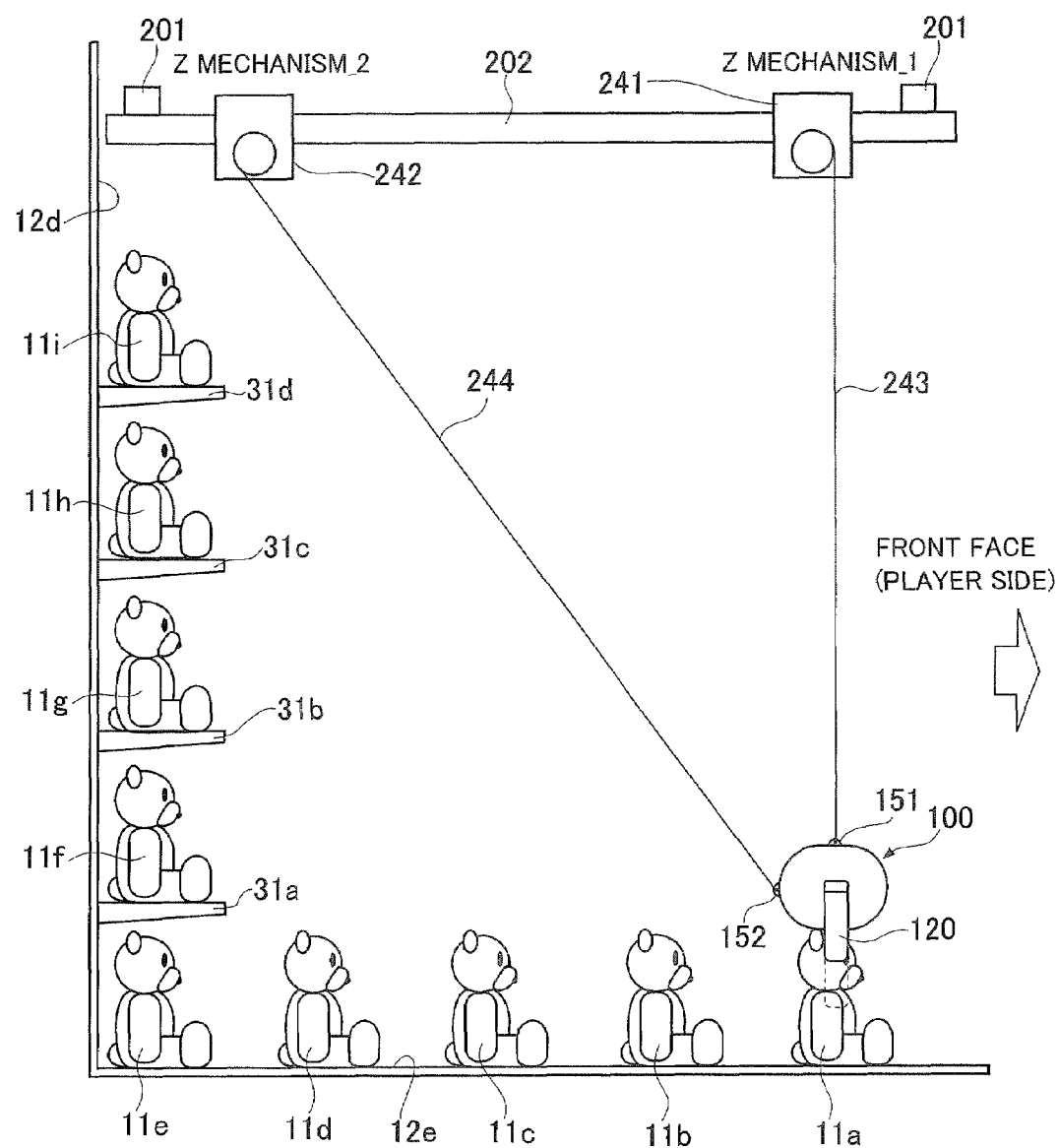
FIG. 6 is a diagram illustrating the positional relationship between an object grasping system and a first and a second wire when a first prize disposed directly below a reference position in the Y direction (longitudinal direction) is grasped in the prize-winning game machine of FIG. 1.

FIG. 6 is a diagram illustrating the positional relationship between the object grasping system 100 and the first and second wires 243 and 244 when the first prize 11a disposed directly below a reference position in the Y direction is grasped. FIGS. 7(a) and 7(b) are partial enlarged diagrams of FIG. 6 for illustrating the consecutive process of grasping the first prize 11a disposed directly below the reference position in the Y direction.

In FIG. 7(a), the object grasping system 100 is moved vertically downward (i.e., in a direction indicated by the arrow A in FIG. 7(a)) from the reference position in the Y direction. In this stage, the load of the object grasping system 100 is carried mainly by the first wire 243. At the same time, the second Z mechanism 242 controls the length of the second wire 244 to produce a tension. For this reason, the object grasping system 100 never turns in the right and left directions. While the object grasping system 100 is moved, the grasping arms 120 open.

In FIG. 7(b), the object grasping system 100 comes into contact with the first prize 11a or the floor 12e, whereupon the downward movement of the object grasping system 100 is stopped. The contact with the first prize 11a is judged when the first tension sensor 261 detects that the tension on the first wire 243 became zero because of the contact. The contact with the floor 12e can be judged when a predetermined length or a predetermined amount of the first wire 243 is unwound, or alternatively when the first tension sensor 261 detects that the tension is reduced to zero.

Upon the judgment that the object grasping system 100 came into contact with the first prize 11a or the floor 12e, the grasping arms 120 closes to grasp the first prize 11a from right above.

Figure 8:
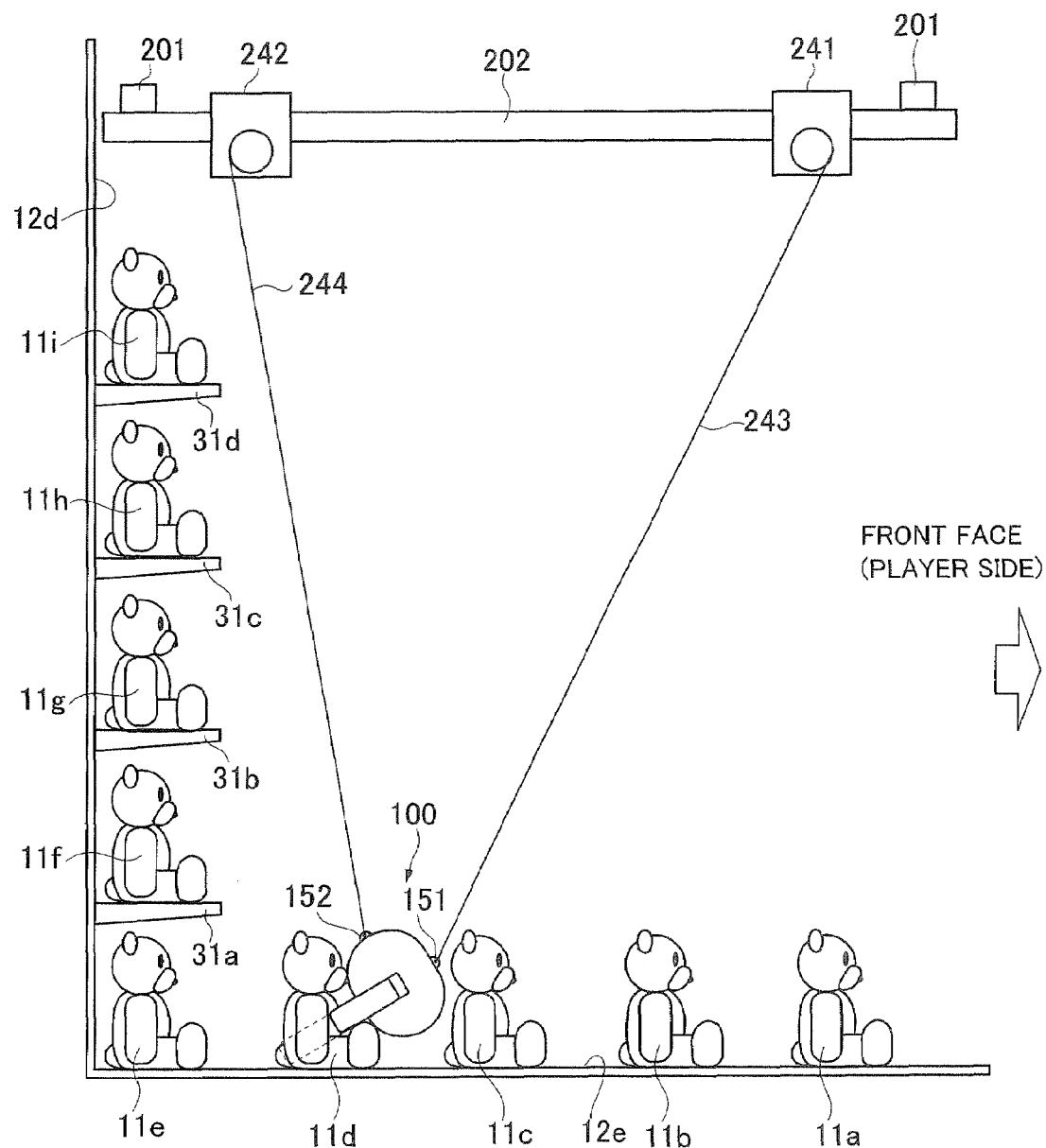
FIG. 8 is a diagram illustrating the positional relationship between the object grasping system and the first and the second wire when a fourth prize is grasped in the prize-winning game machine of FIG. 1.
Figure 9:
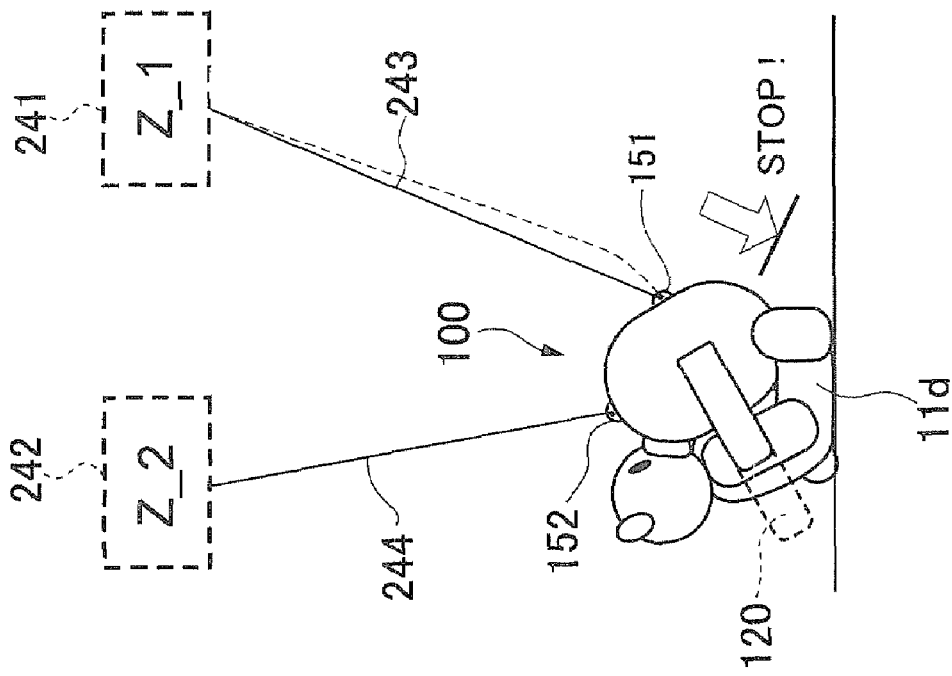
FIG. 9(a) and FIG. 9(b) are the respective partial enlarged diagrams of FIG. 8 for illustrating the consecutive processes of grasping the fourth prize.
Figure 9:
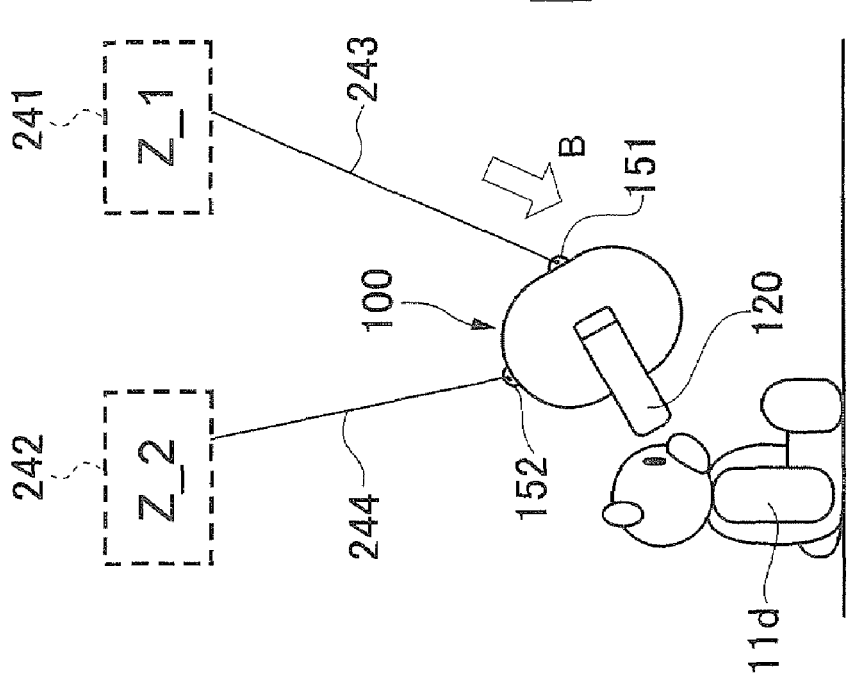

Next, the operation for grasping one of the second to fourth prizes 11b to 11d arranged in a central portion of the floor 12e from the front face toward the back face will be described with reference to FIG. 8 and FIGS. 9(a) and 9(b). FIG. 8 is a diagram illustrating the positional relationship between the object grasping system 100 and the first and second wires 243 and 244, for example, when the fourth prize 11d is grasped. FIGS. 9(a) and 9(b) show a partial enlarged diagram of FIG. 8 for illustrating the process of grasping the fourth prize 11d.

In FIG. 9(a), the object grasping system 100 is moved diagonally downward to the left (i.e., in a direction indicated by the arrow B in FIG. 9(a)) from the reference position in the Y direction. In this stage, the load of the object grasping system 100 is carried by the first wire 243 and the second wire 244. The first wire fastening portion 151 is rotated downward in the clockwise direction in FIG. 9(a), and the second wire fastening portion 152 is rotated upward in the clockwise direction in FIG. 9(a). Along with this rotation, the orientation of the grasping arms 120 is rotated upward from the vertically downward direction shown in FIG. 7(a), and eventually the grasping arms 120 faces diagonally downward to the left. As in the case of the operation in FIGS. 7(a) and 7(b), the first and second Z mechanisms 241 and 242 control the amount of unwinding of the respective first and second wires 243 and 244 to produce tensions on the first and second wires 243 and 244. For this reason, the object grasping system 100 never turns in the right and left directions.

In FIG. 9(b), the object grasping system 100 is moved downward to come into contact with the fourth prize 11d or the floor 12e, whereupon the downward movement of the object grasping system 100 is stopped. The contact with the fourth prize 11d is judged when the first or second tension sensor 261 or 262 detects that the tension on at least the first or second wire 242 or 243 became zero because of the contact.

Upon the judgment that the object grasping system 100 came into contact with the fourth prize 11d or the floor 12e, the grasping arms 120 closes to grasp the fourth prize 11d in such a manner as to hold it from the diagonally upward direction and from left to right.

Figure 10:
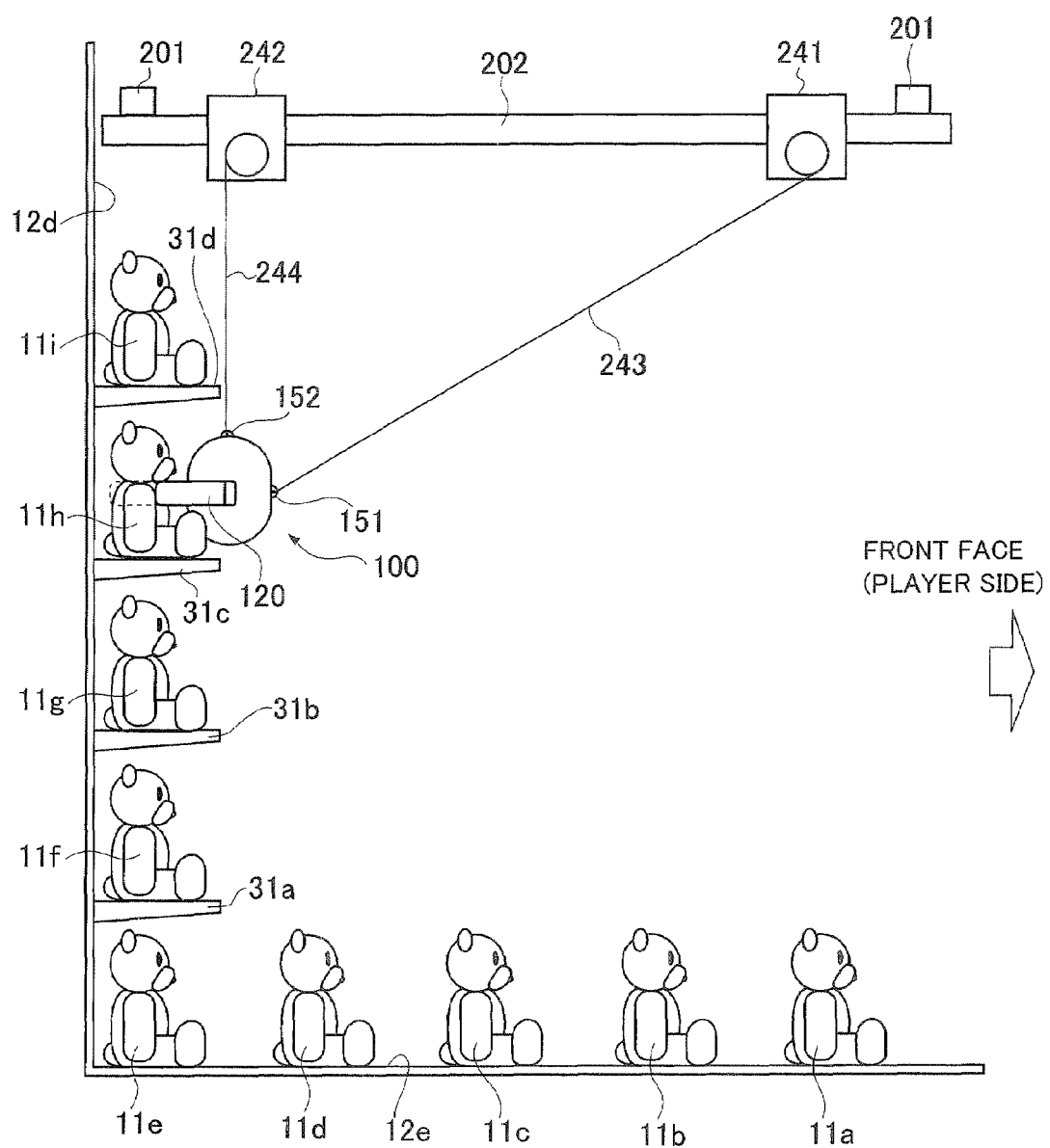
FIG. 10 is a diagram illustrating the positional relationship between the object grasping system and the first and the second wire when an eighth prize disposed on a third prize shelf which is the second one from the top is grasped in the prize-winning game machine of FIG. 1.
Figure 11:
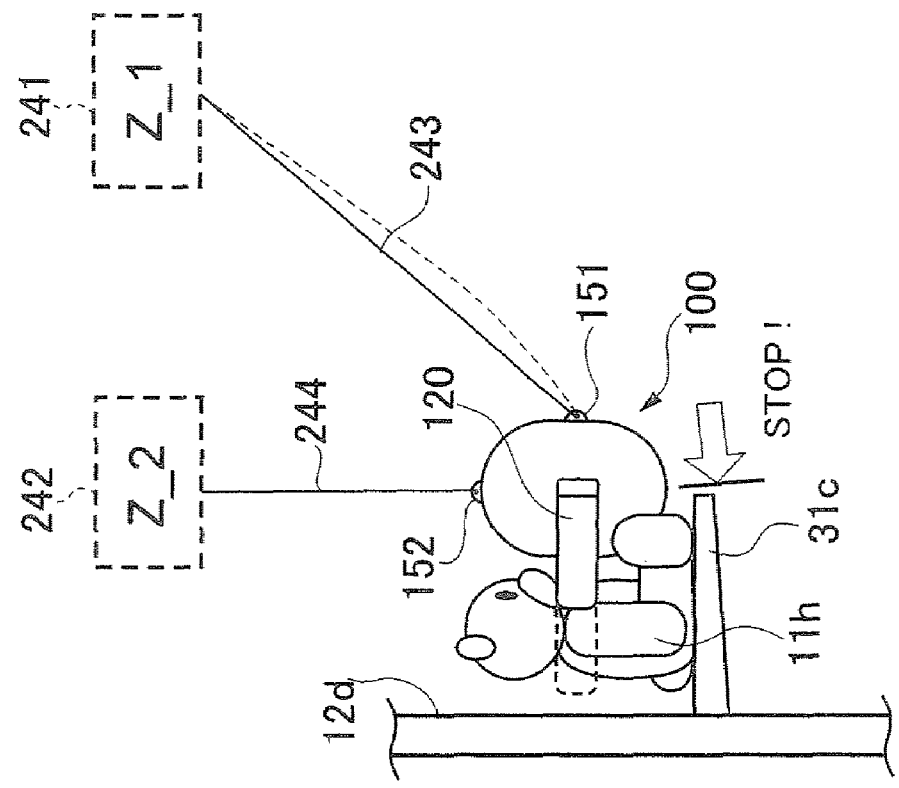
FIG. 11(a) and FIG. 11(b) are the respective partial enlarged diagrams of FIG. 10 for illustrating the consecutive processes of grasping the eighth prize.
Figure 11:
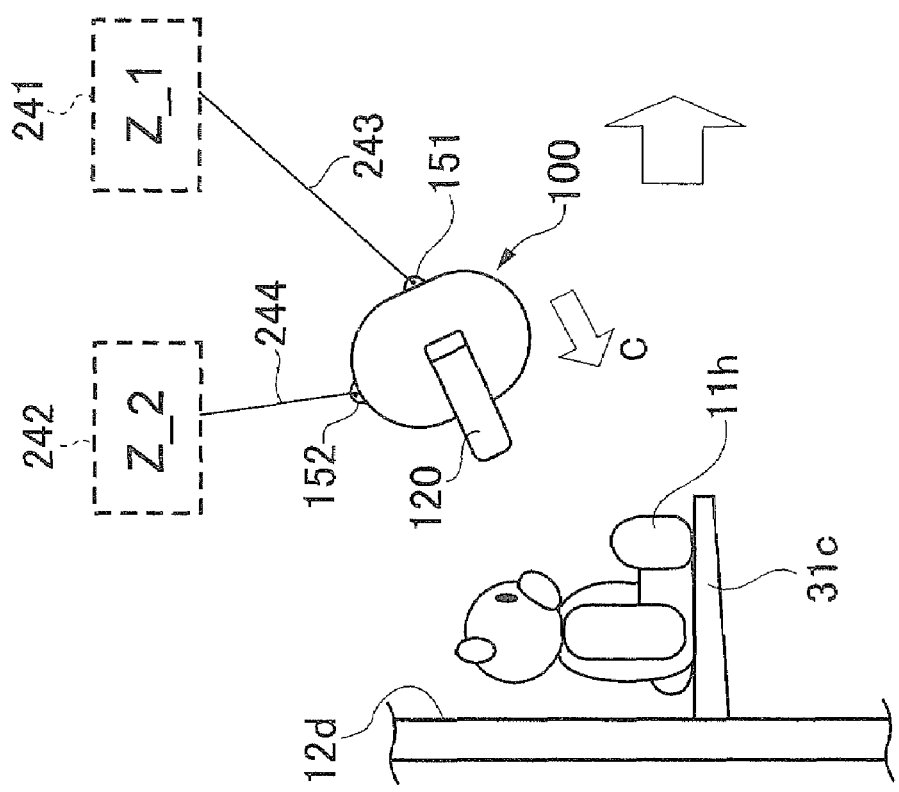

Next, with reference to FIG. 10 and FIGS. 11(a) and 11(b), a description will be given of the operation for grasping the fifth prize 11e disposed on a portion of the floor 11e close to the back face or one of the sixth to ninth prizes 11f to 11i arranged on the first to fourth prize shelves 31a to 31d. FIG. 10 is a diagram illustrating the positional relationship between the object grasping system 100 and the first and second wires 243 and 244 in the process of grasping, for example, the eighth prize 11h disposed on the third prize shelf 31c which the second one from the top. FIGS. 11(a) and 11(b) are partial enlarged diagrams of FIG. 10 for illustrating the process of grasping the eighth prize 11h.

In FIG. 11(a), the object grasping system 100 is moved diagonally downward to the left (i.e., in a direction indicated by the arrow C in FIG. 11(a)) from the reference position in the Y direction. In this stage, the load of the object grasping system 100 is carried by the first wire 243 and the second wire 244. The first wire fastening portion 151 is rotated downward in the clockwise direction in FIG. 11(a), and the second wire fastening portion 152 is rotated upward in the clockwise direction in FIG. 11(a). Along with this rotation, the orientation of the grasping arms 120 is changed to a diagonally downward direction, but is slightly upward with respect to the case described in FIG. 9(a). As in the case of the operation in FIGS. 7(a) and 7(b), the first and second Z mechanisms 241 and 242 control the amount of unwinding of the respective first and second wires 243 and 244 to produce tensions on the first and second wires 243 and 244. For this reason, the object grasping system 100 never turns in the right and left directions.

In the FIG. 11(b), the object grasping system 100 is moved downward to come into contact with the eighth prize 11h disposed on the third shelf 31c, whereupon the full load of the object grasping system 100 is carried by the second wire 244. Therefore, the first wire 243 has no tension. Then, the downward movement of the object grasping system 100 is stopped when the first tension sensor 261 detects that the tension on the first wire 243 became zero.

In this stage, the second wire 244 extends in the approximately vertical direction. The second wire fastening portion 152 is located at approximately zero degrees and the first wire fastening portion 151 is located at approximately 90 degrees. Because of this positional relationship, the grasping direction of the grasping arms 120 can be approximately aligned with the horizontal direction (the left direction in FIGS. 11(a) and 11(b)).

It is not necessary to require that the first wire fastening portion 151 is located at approximately 90 degrees and the second wire fastening portion 152 is located at approximately zero degrees. That is, as described earlier, when the object grasping system 100 is in its home position shown in FIG. 5, the second wire fastening portion 152 can be set to any position as long as it is located such that the second wire 244 is located outside the second extension line (i.e., the left direction in FIGS. 11(a) and 11(b)).

Next, the control of the operation of the aforementioned object grasping system 100 will be described.

Figure 12:
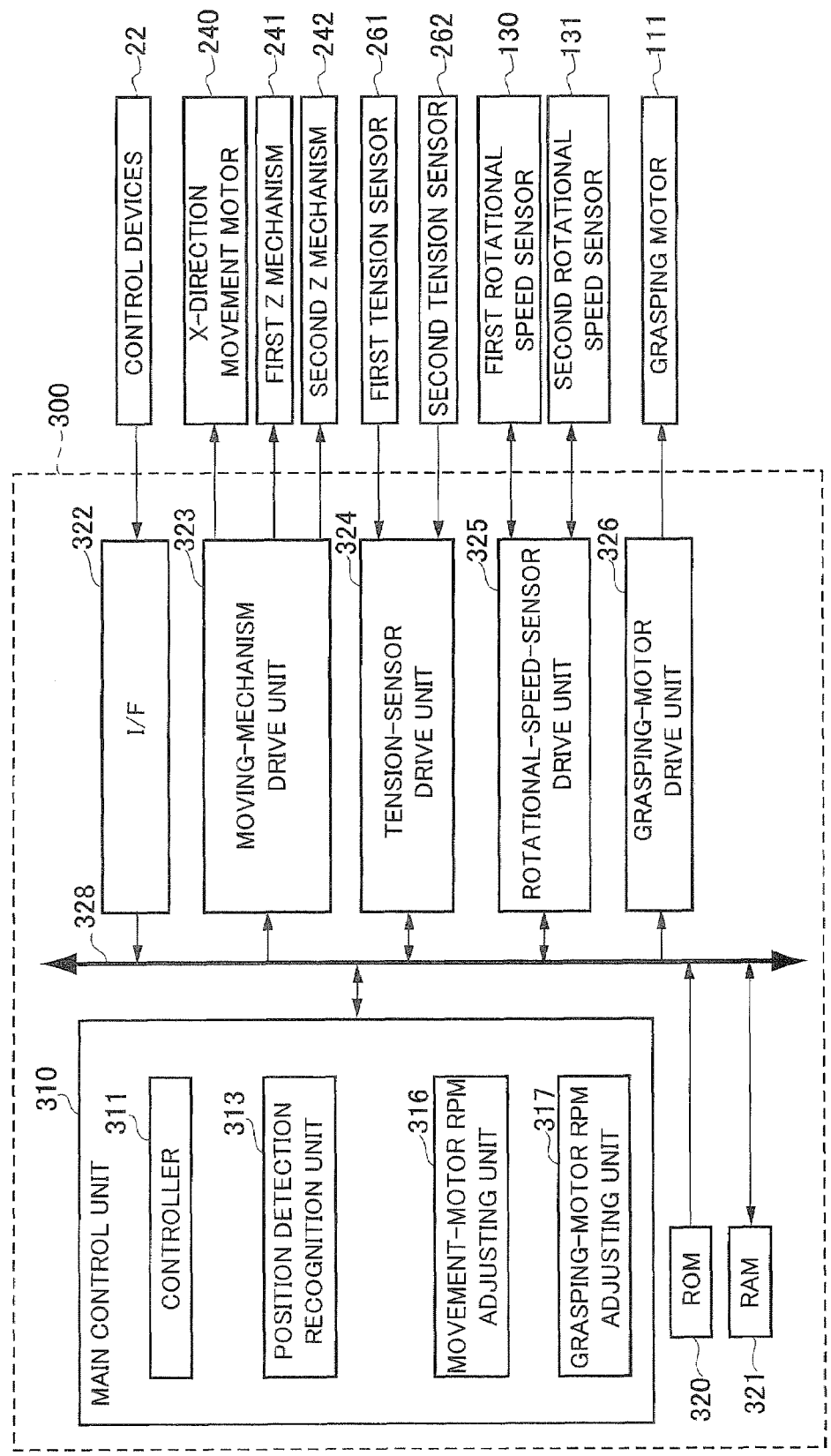
FIG. 12 is a functional block diagram illustrating in detail the control system of the prize-winning game machine of FIG. 1.

FIG. 12 is a functional block diagram illustrating a control system 300 of the game machine 1 in detail.

The control system 300 comprises a main control unit 310, a ROM (Read Only Memory) 320, a RAM (Random Access Memory) 321, an I/F (Interface) 322, a moving-mechanism drive unit 323, a tension-sensor drive unit 324, a rotational-speed-sensor drive unit 325 and a grasping-motor drive unit 326, which are connected to a data bus 328.

The main control unit 310 comprises a controller 311, a position detection recognition unit 313, a movement-motor rotational-speed adjusting unit 316 and a grasping-motor rotational-speed adjusting unit 317. These components of the main control unit 310 may be either hardware or software.

The controller 311 controls operation for each component based on a predetermined control program stored in the ROM 320. The controller 311 mainly controls the moving mechanism assembly 200 based on the user operation performed on the operation members 22 in order to move the object grasping system 100 in the right-and-left direction (the X direction), the fore-and-aft direction (the Y direction) or the up-and-down direction (the Z direction).

The position detection recognition unit 313 recognizes a position of the object grasping system 100 in the Y direction and the Z direction in accordance with the results of the detections in the first rotational speed sensor 130 and the second rotational speed sensor 131. The first and second rotational speed sensors 130 and 131 are respectively mounted on the first and second Z mechanisms 241 and 242 as described earlier.

The positions in the Y direction and the Z direction can be calculated from the length of each of the first and second wires 243 and 244. Specifically, the distance between the first and second Z mechanisms 241 and 242 is fixed during at least the game. Therefore, the position of the object grasping system 100 in the Y direction and the Z direction and the degree of rotation in the up-and-down direction (the grasping direction) can be obtained from the lengths of the first and second wires 243 and 244 unwound from the first and second Z mechanisms 241 and 242.

For obtaining the position and the like of the object grasping system 100, a triaxial sensor may be provided for detecting the position of the object grasping system 100 in the X, Y and Z directions. Alternatively, a light-sensitive device may be provided in the crane game machine 1, and a light-emitting device may be provided in the object grasping system 100.

The movement-motor rotational-speed adjusting unit 316 calculates an adjustment value used for adjustment of the amount of rotational drive of the X-direction movement motor 240 mounted on the traverse stationary rail 201 of the moving mechanism assembly 200

The grasping-motor rotational-speed adjusting unit 317 calculates an adjustment value for adjusting the amount of rotational drive of the grasping motor (m) 111 and an adjustment value for adjusting the degree of open angle of the claw 123 of each grasping arm 120 and the grasping force of each grasping arm 12.

The tension sensor drive unit 324 obtains the detected presence/absence of tension produced on the first wire 243 and the second wire 244 from the first tension sensor 261 and the second tension sensor 262.

The ROM 320 stores a predetermined control program required for the control executed by the controller 311. The RAM 321 stores the results of predetermination calculations performed by the controller 311, the results of recognition of the position detection recognition unit 313, the adjustment values calculated by the movement-motor rotational-speed adjusting unit 316, the adjustment values calculated by the grasping-motor rotational-speed adjusting unit 317, and the like.

The I/F (interface) 322 transfers an operation signal generated by the user operation member 22 to the main control unit 310. The moving-mechanism drive unit 323 rotates the X-direction movement motor 240 mounted on the traverse stationary rail 201 or the first and second Z mechanisms 241 and 242 mounted on the motor-supporting longitudinal rail 202, based on the adjustment values calculated by the movement-motor rotational-speed adjusting unit 316.

The rotational-speed-sensor drive unit 325 drives the first rotational speed sensor 130 and the second rotational speed sensor 131 and transfers the detection results of the first rotational speed sensor 130 and/or the second rotational speed sensor 131 to the main control unit 310. The grasping-motor drive unit 326 rotates the grasping motor (m) 111 on the basis of the adjustment value calculated by the grasping-motor rotational-speed adjusting unit 317.

Next, the structure of the first tension sensor 261 and the second tension sensor 262 will be described. The first tension sensor 261 and the second tension sensor 262 have the same structure. The first tension sensor 261 and the second tension sensor 262 may be, for example, typical torque sensors, which can be respectively mounted on the motor shafts of the first Z mechanism 241 and the second Z mechanism 242 to measure the torques of the motor shafts from which the presence/absence of tension can be determined.

Figure 13:
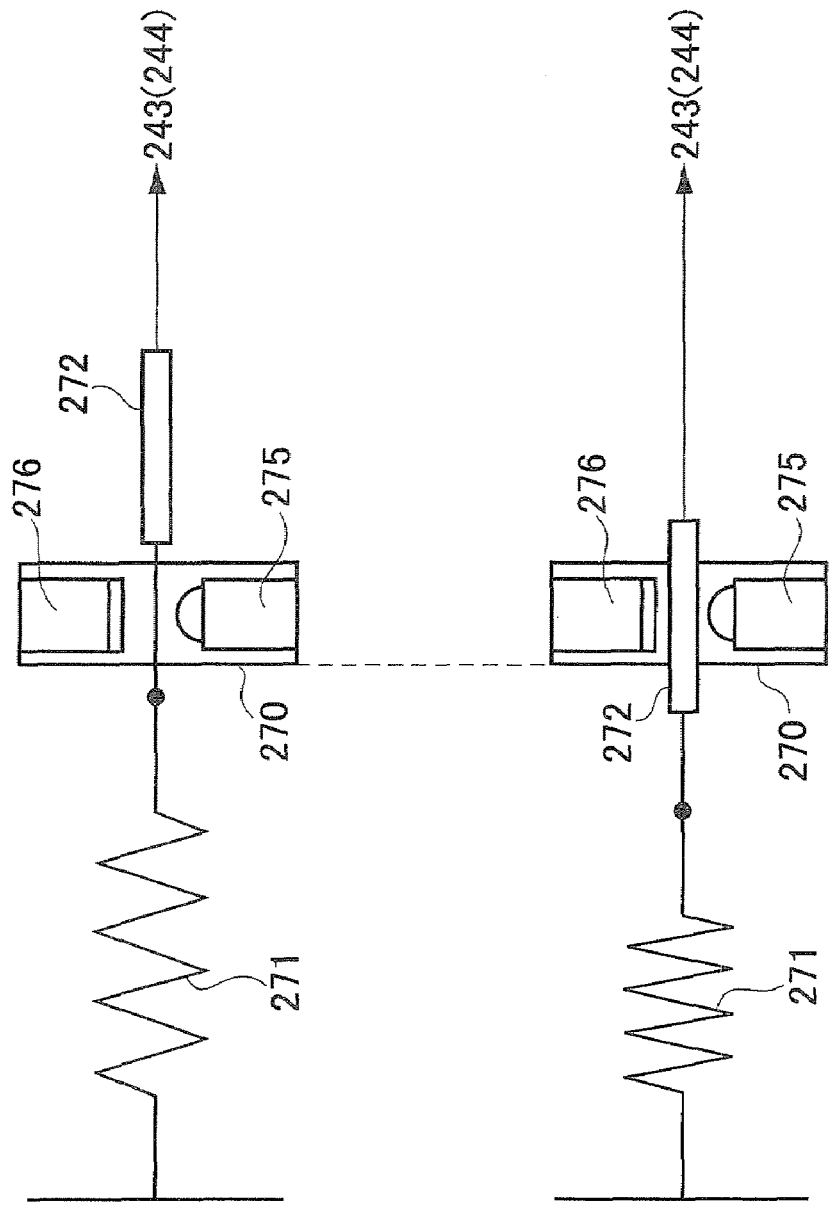
FIG. 13(a) and FIG. 13(b) are diagrams illustrating an example of a photosensor used as a first tension sensor or a second tension sensor.

If the detection of the presence/absence of tension is simply required, a photo sensor 270 as shown in FIGS. 13(a) and 13(b) can be employed. The first tension sensor 261 and the second tension sensor 262, which comprise the photo sensors 270, respectively include light-shield members 272. The light-shield members 272 are respectively attached to urging members 271 such as a spring, and move leftward/rightward depending on the presence/absence of tension on the first and second wires 243 and 244.

In the state shown in FIG. 13(a), tension acts on the first wire 243, or the second wire 244. In this stage, the light-shield member 272 attached to the urging member 271 is moved rightward because the urging member is extended by tension acting on the first wire 243 or the second wire 244. As a result, the light emitted from a light emitter 275 of the photo sensor 270 is detected by a photo receiver 276.

FIG. 13(b) shows the first wire 243 or the second wire 244, on which no tension act. In this stage, the light-shield member 272 is placed between the light emitter 275 and the photo receiver 276 of the photo sensor 270 because the urging member 271 does not receive any tension and shrinks. As a result, the light emitted from the light emitter 275 of the photo sensor 270 is not detected by the photo receiver 276.

Next, the player operation of the game machine 1 and the behavior of the object grasping system 100 based on the player operation will be described with reference to flow charts shown in FIG. 14 to FIG. 17.

Figure 14:
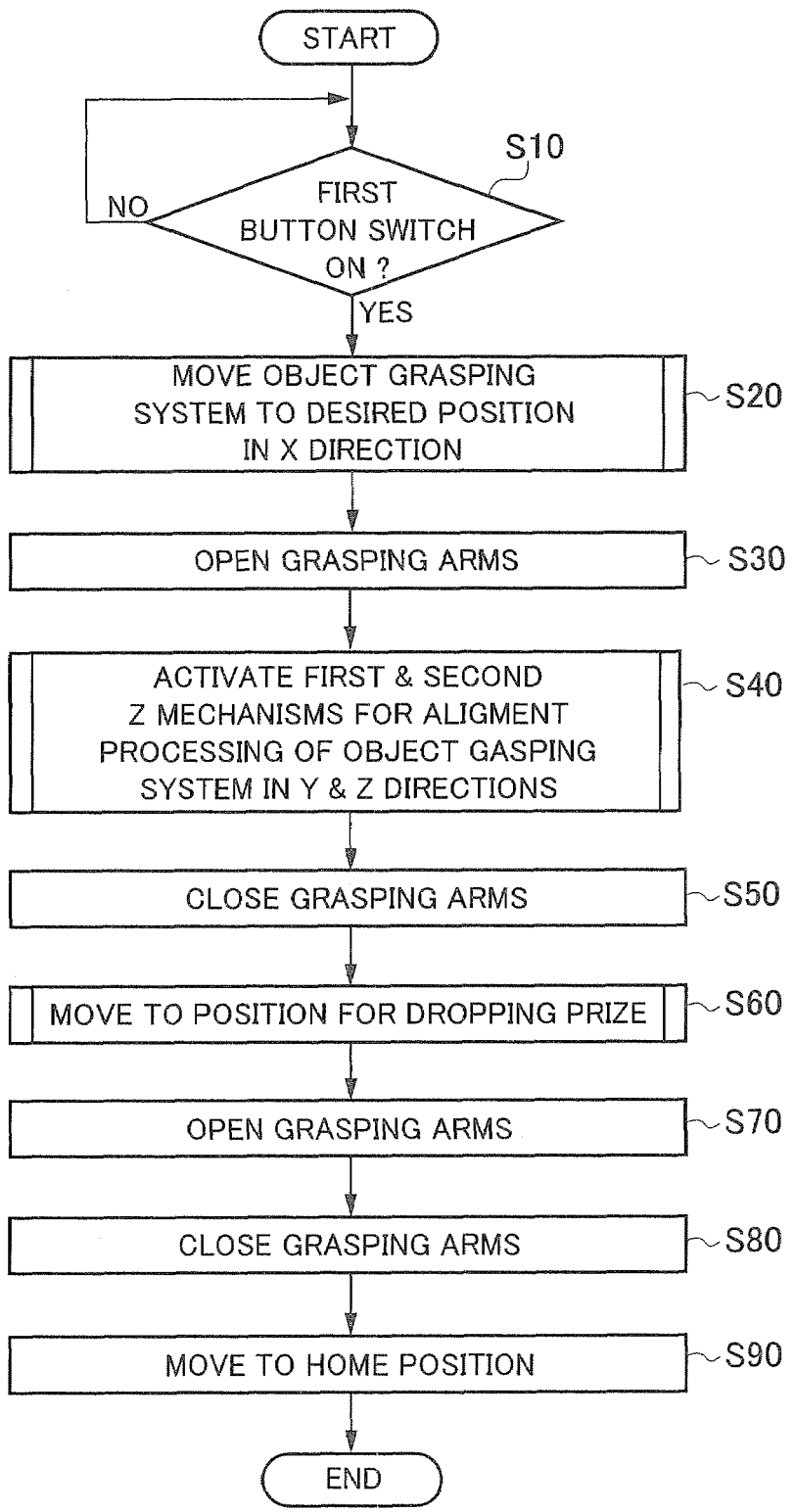
FIG. 14 is a flowchart illustrating the outline of the player operation on the prize-winning game machine as shown in FIG. 1 and the behavior of the object grasping system in response to the player operation.

FIG. 14 is a flowchart describing the player operation of the game machine 1 and the outline of the object grasping system 100.

The player inserts a predetermined coin into the coin slot 23 to start a game. The movement of the object grasping system 100 is in a standby state until the first button switch 22a is pressed (No in S10). When the player presses the first button switch 22a (Yes in S10), the control system 300 moves the object grasping system 100 in the X direction and stops at a desired position (S20).

Figure 15:
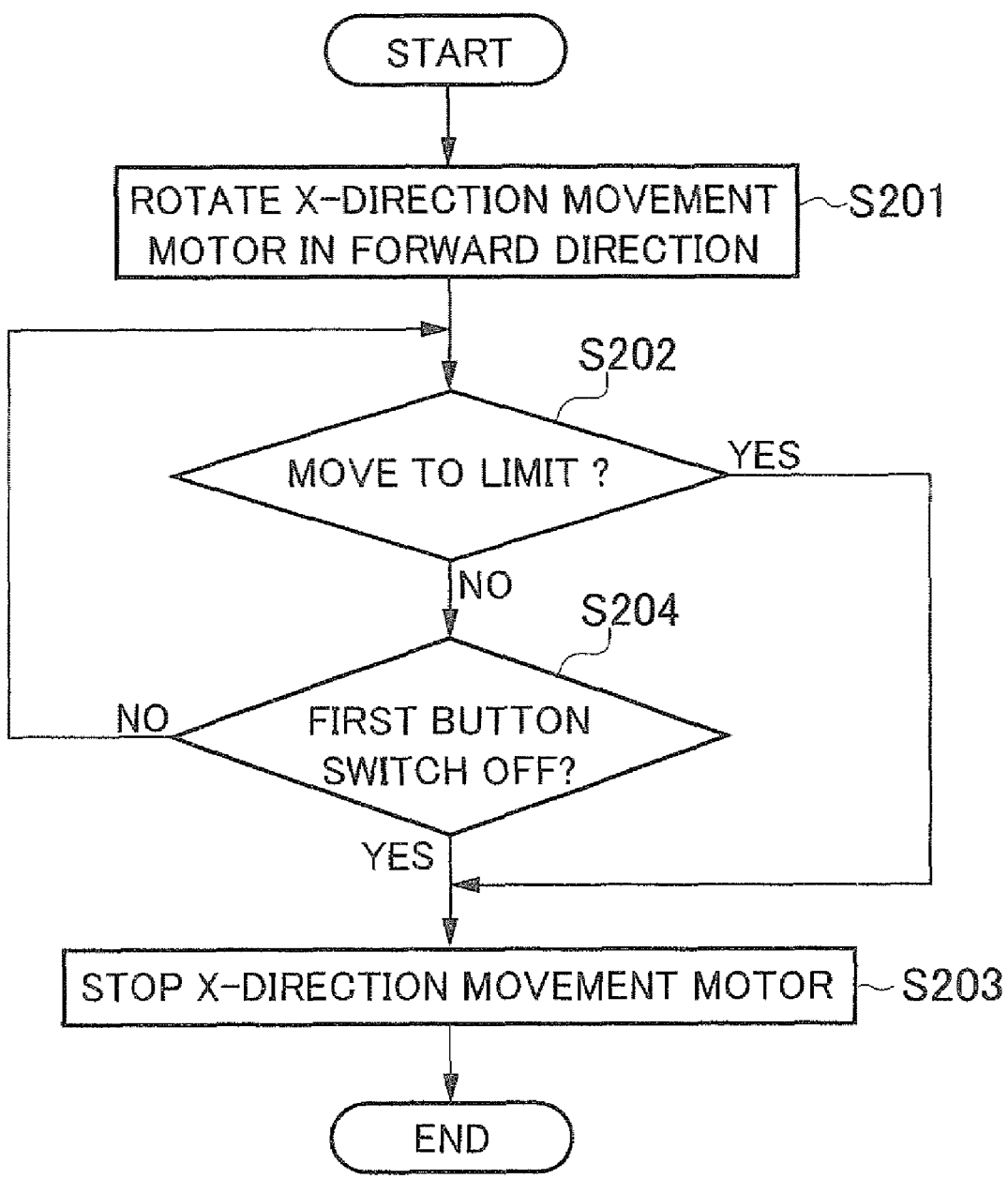
FIG. 15 is a flowchart illustrating in detail the process of moving the object grasping system in the X direction (traverse direction) and stopping it at a desired location in the prize-winning game machine of FIG. 1.

The operation in step S20 is described with reference to a flowchart in FIG. 15. In step S20, first, the control system 300 activates and rotates the X-direction movement motor 240 in the normal direction (S201), whereupon the motor-supporting longitudinal rail 202 moves in the X direction.

When the motor-supporting longitudinal rail 202 reaches the limit position (Yes in S202), the control system 300 stops the X-direction movement motor 240 (S203). If the motor-supporting longitudinal rail 202 does not reach the limit position (No in S202), when the player releases the first button switch 22a (S204), the control system 300 stops the X-direction movement motor 240 (S203). The X-direction movement motor 240 keeps moving while the player presses the first button switch 22a (No in S204) and/or until the motor-supporting longitudinal rail 202 reaches the limit position (No in S202).

When the X-direction movement motor 240 stops, the processing in this flow (S20) is terminated. The procedure returns to step S30 in FIG. 14 to open the grasping arms 120 (S30). The control system 300 activates the first and second Z mechanisms 241 and 242 to start the alignment processing for the object grasping system 100 in the Y direction and the Z direction.

Figure 16:
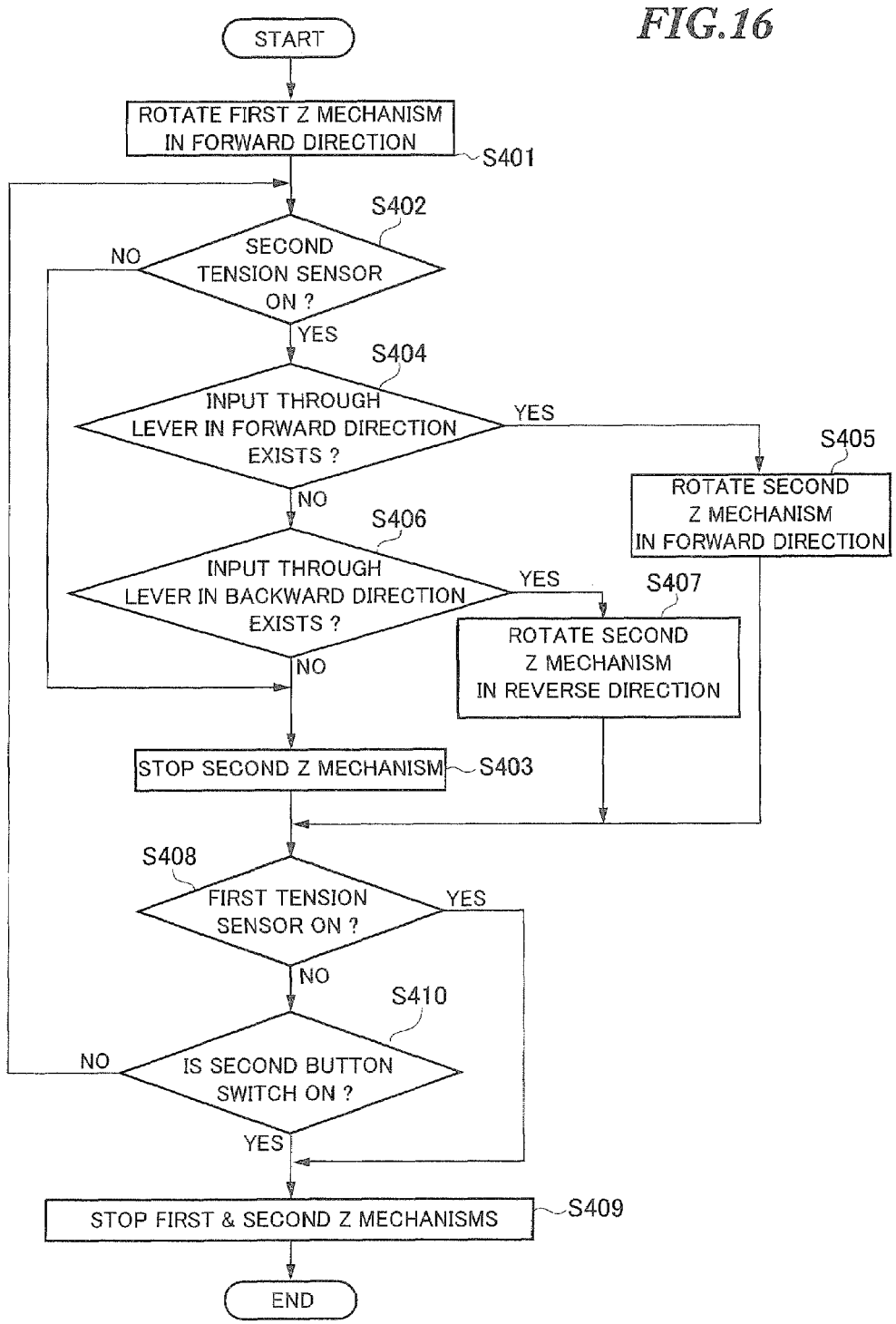
FIG. 16 is a flowchart illustrating in detail the process of using a first Z mechanism and a second Z mechanism to achieve alignment of the object grasping system with a target prize in the Y direction and in the Z direction (vertical direction) in the prize-winning game machine of FIG. 1.

The operation in step S 40 is described in a flowchart in FIG. 16. First, the control system 300 activates and rotates the first Z mechanism 241 in the forward direction (S401). As a result, the first wire 243 is unwound from the first Z mechanism 241, so that the object grasping system 100 moves downward. However, the second Z mechanism 242 is not activated, so that the length of the second wire 244 is not changed. As a result, the object grasping system 100 moves so as to arc about the second Z mechanism 242.

When the second tension sensor 262 detects tension on the second wire 244 (No in S402), the control system 300 determines whether or not the player operates the lever 22b to move the second Z mechanism 242 forward (S404). If the lever 22b is operated for forward movement (Yes in S404), the control system 300 rotate the second Z mechanism 242 in the forward direction (S405) If the lever 22b is not operated for forward movement (No in S404), the control system 300 determines whether or not the player operates the lever 22b to move the second Z mechanism 242 backward (S406). If the lever 22b is operated for backward movement (Yes in S406), the control system 300 rotates the second Z mechanism 242 in the reverse direction (S407).

If tension is not detected at S402 (Yes in S402), and if the lever 22b is not operated for the backward movement (No in S406), the control system 300 stops the operation of the second Z mechanism 242 (S403).

Upon the completion of the processing in steps S403, S405 and S406, the control system 300 determines whether or not the first tension sensor 261 detects tension on the first wire 243 (S408). If the first tension sensor 261 is ON, the tension is not produced. If the first tension sensor 261 is OFF because of the tension (No in Step S508), the control system 300 determines whether or not the player presses the second button switch 22c (S410). If the second button switch 22c is not pressed (No in S410), the procedure returns to Step S402.

If the control system 300 determined that the first tension sensor 261 is ON because tension is not produced (Yes in S408), and if the second button switch 22c is pressed (Yes in S410), the control system 300 stops the first and second Z mechanisms 241, 242 (S409), and terminates the processing in Step 40. Then, the procedure goes to the processing in Step S50 in FIG. 14, where the control system 300 starts the processing operation for closing the grasping arms 120 to grasp the prize 11 (S50).

Upon the completion of the processing in Step S50, the control system 300 moves the object grasping system 100 back to the home position and causes it to drop the prize into the prize outlet 13 (S60).

Figure 17:
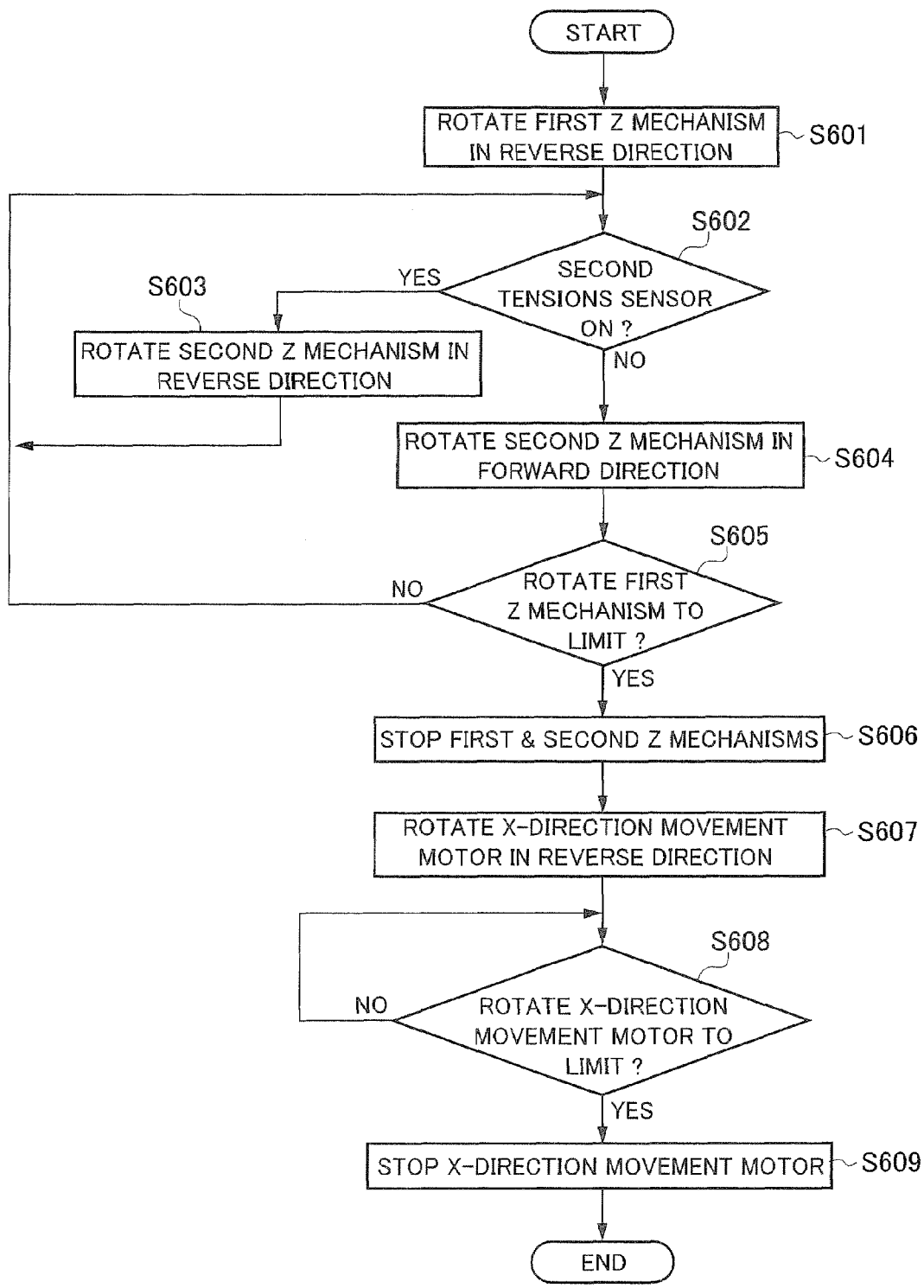
FIG. 17 is a flowchart illustrating in detail the process for returning the object grasping system to its home position and dropping the grasping prize into a prize outlet in the prize-winning game machine of FIG. 1.

The processing in Step S60 will be described below in detail with reference to the flowchart in FIG. 17. Upon the closing of the grasping arms 120 (S50), the control system 300 rotates the first z mechanism 241 in the reverse direction (S601). Then, the second tension sensor 262 detects whether or not tension is present on the second wire 244 (S602). If there is not tension (Yes in S602), the control system 300 rotates the second z mechanism 242 in the reverse direction (S603). Then, the procedure goes back to Step S602.

On the other hand, if tension is detected on the second wire 244 in the processing in Step S602 (No in S602), the control system 300 rotates the second Z mechanism 242 in the forward direction (S604). Then, the control system 300 determines whether or not the first Z mechanism 241 rotates to the limit in the reverse direction (S605). If the control system 300 determines that the first Z mechanism 241 does not rotate to the limit in the reverse direction (No in S605), the procedure returns to the processing in Step S602.

If the control system 300 determines that the first Z mechanism 241 rotates to the limit in the reverse direction (Yes in S605), it stops the first and second Z mechanisms 241 and 241 (S606), then starts rotating the X-direction movement motor 240 in the reverse direction in order to move the motor-supporting longitudinal rail 202 to a position above the prize outlet 13 (S607).

The control system 300 continues the operation of the X-direction movement motor 240 until it rotates to the limit in the reverse direction (No in S608). Then, when the X-direction movement motor 240 rotates to the limit in the reverse direction (Yes in S608), the control system 300 stops the X-direction movement motor 240 (S609). As a result, the movement of object grasping system 100 to the prize outlet 13 in the processing in Step S60 is completed. Then, the procedure goes to the processing in Step S70 in FIG. 14.

In the processing in Step S70, the control system 300 opens the grasping arms 120 (S70). Then, when the grasping arms 120 hold the prize 11, the prize 11 is dropped into the prize outlet 13. When it does not hold the prize 11, the grasping arms 120 simply open. Then, the control system 300 closes the grasping arms 120 (S80) and then moves the object grasping system 100 back to the home position (S90).

The forgoing embodiment has described the control method in which the first Z mechanism 241 is driven to unwind the first wire 243 before the second wire 244 is unwound from the second Z mechanism 242, and then the second wire 244 is rewound/unwound to move the object grasping system 100 based on the player operation. However, the first wire 243 and the second wire 244 may be simultaneously rewound/unwound through a method for controlling the amount of unwinding of a rope as described in Japanese Patent Unexamined Publication No. S49-94095.

According to the foregoing embodiment, it is possible to significantly ease the limitation on the directions in which the object grasping apparatus having the grasping arms 120 can grasp a prize. In addition, the limitation on the arrangement of the prizes can be significantly eased. For example, the prizes can be arranged in the vertical direction along the back wall face of the prize container, which has been conventionally impossible. Further, a mechanism for moving an object grasping system along rails in the fore-and-aft direction can be omitted. Instead of this mechanism, the motors alone are provided for winding/unwinding the wires. In consequence, the upper space of the prize container of the game machine which is required for the mechanism is free, resulting in the effective use of the space in the prize container.

The present invention is also applicable to other machines such as a machine tool which grasps a predetermined object and carries it to a predetermined location.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A prize-winning game machine, comprising:
   operation means operated by a player;
   a playing field containing prizes;
   a grasping member having arms either hooking or grasping one of the prizes;
   a movement mechanism for moving the grasping member in a predetermined direction on the basis of operation from the operation means;
   at least two wires or more for suspending the grasping member;
   two wire fastening members or more which are provided on the grasping member and to which the wires are respectively fastened; and
   at least two drive mechanisms or more corresponding to the wires as provided in the movement mechanism for adjusting respective winding/unwinding amounts of the wires,
   wherein the wires are respectively extended out from a predetermined positions of the respective drive mechanisms located away from each other to the respective wire fastening members on the grasping member so that the grasping member is suspended by the wires, and the drive mechanisms are independently adjusted to turn a portion of the grasping member coming into contact with the prize at least in an up-and-down direction.

2. The prize-winning game machine according to claim 1, wherein at least one of the drive mechanisms is adjustable in position.

3. The prize-winning game machine according to claim 1, wherein each of the drive mechanisms is a motor provided in the predetermined position, and has a wire control member for controlling the winding/unwinding amount of the wire by use of the motor to rewind or unwind the wire.

4. The prize-winning game machine according to claim 3, wherein at least one of the wire fastening members is attached to allow the arms to be turned when one of the drive mechanisms corresponding to the at least one wire fastening member winds/unwinds the wire.

5. The prize-winning game machine according to claim 4, wherein the wire control member controls the unwinding amount of the wire to produce tension on the wire.

6. The prize-winning game machine according to claim 5, wherein the wire control member comprises a tension detector for detecting presence/absence of tension produced on the wire.

7. The prize-winning game machine according to claim 1, further comprising a plurality of prize shelves for arranging the prizes.

8. An object grasping apparatus, comprising:
   a grasping member having arms either hooking or grasping an object;
   at least two wires or more for suspending the grasping member;
   two wire fastening members or more which are provided on the grasping member and to which the wires are respectively fastened; and
   at least two drive mechanisms or more corresponding to the respective wires as provided for adjusting respective unwinding amounts of the wires,
   wherein the wires are respectively extended out from a predetermined positions of the respective drive mechanisms located away from each other to the respective wire fastening members on the grasping member so that the grasping member is suspended by the wires, and the drive mechanisms are independently adjusted to turn a portion of the grasping member coming into contact with the object at least in an up-and-down direction.

* * * * *